(12) United States Patent
Nasser

(10) Patent No.: US 8,931,796 B2
(45) Date of Patent: Jan. 13, 2015

(54) PROPULSION SYSTEMS FOR MANUALLY OPERATED MOBILITY DEVICES

(71) Applicant: Rowheels, Inc., Madison, WI (US)

(72) Inventor: Salim Nasser, Merritt Island, FL (US)

(73) Assignee: Rowheels, Inc., Fitchburg, WI (US)

( * ) Notice: Subject to any disclaimer, the term of this patent is extended or adjusted under 35 U.S.C. 154(b) by 0 days.

(21) Appl. No.: 13/827,647

(22) Filed: Mar. 14, 2013

(65) Prior Publication Data

US 2013/0277940 A1    Oct. 24, 2013

Related U.S. Application Data

(60) Provisional application No. 61/636,106, filed on Apr. 20, 2012.

(51) Int. Cl.
| | |
|---|---|
| *A61G 5/10* | (2006.01) |
| *B62M 1/14* | (2006.01) |
| *A61G 5/02* | (2006.01) |
| *F16H 3/66* | (2006.01) |

(52) U.S. Cl.
CPC ............... *A61G 5/022* (2013.01); *A61G 5/023* (2013.01); *F16H 3/66* (2013.01)
USPC ..................... 280/304.1; 280/237; 280/250.1

(58) Field of Classification Search
USPC ............ 280/250.1, 304.1, 236, 237; 475/269, 475/319, 331, 349
See application file for complete search history.

(56) References Cited

U.S. PATENT DOCUMENTS

| | | | |
|---|---|---|---|
| 3,563,568 A * | 2/1971 | Sasse et al. ................... | 280/230 |
| 5,362,081 A | 11/1994 | Beidler et al. | |
| 5,482,305 A * | 1/1996 | Jeffries et al. .............. | 280/250.1 |
| 5,743,544 A * | 4/1998 | Weaver ......................... | 280/249 |
| 5,846,154 A * | 12/1998 | Godin ........................... | 475/331 |
| 7,780,179 B2 * | 8/2010 | Brown ......................... | 280/246 |

(Continued)

FOREIGN PATENT DOCUMENTS

| | | |
|---|---|---|
| EP | 1 523 969 | 4/2005 |
| WO | WO-98/03142 | 1/1998 |
| WO | WO-98/37849 | 9/1998 |

OTHER PUBLICATIONS

Darren Quick, "Rowheel System for Wheelchairs Translates Reverse into Forward Motion", Oct. 6, 2010, 6 pages.

(Continued)

*Primary Examiner* — Joseph M Rocca
*Assistant Examiner* — Marc A Scharich
(74) *Attorney, Agent, or Firm* — Foley & Lardner LLP

(57) ABSTRACT

A propulsion system for a manually-operated mobility device includes a hand rim configured to receive a propulsion force from a user of the manually-operated mobility device, a wheel hub fixedly attached to a wheel for the manually-operated mobility device, and a planetary gear system including a sun gear, a ring gear, and one or more planetary gears disposed between the sun gear and the ring gear. The one or more planetary gears are supported by a planet carrier. One of the sun gear and the ring gear is fixedly coupled to the hand rim and the other of the sun gear and the ring gear is fixedly coupled to the wheel hub.

12 Claims, 31 Drawing Sheets

(56) References Cited

U.S. PATENT DOCUMENTS

| | | | |
|---|---|---|---|
| 7,837,210 B2* | 11/2010 | Kylstra et al. | 280/250.1 |
| 2005/0067807 A1* | 3/2005 | Harcourt et al. | 280/246 |
| 2009/0039612 A1* | 2/2009 | Bidwell et al. | 280/250.1 |
| 2009/0051138 A1 | 2/2009 | Kylstra | |
| 2009/0273156 A1* | 11/2009 | Byun | 280/250.1 |
| 2013/0307244 A1* | 11/2013 | Garcia Franca | 280/237 |

OTHER PUBLICATIONS

"Salim Nasser's Better Wheelchair: Rowing the Wheels Rather Than Pushing Them", Oct. 1, 2010, 4 pages.

International Search Report and Written Opinion for International Application No. PCT/US2013/036189, mailed Jul. 22, 2013, 12 pages.

\* cited by examiner

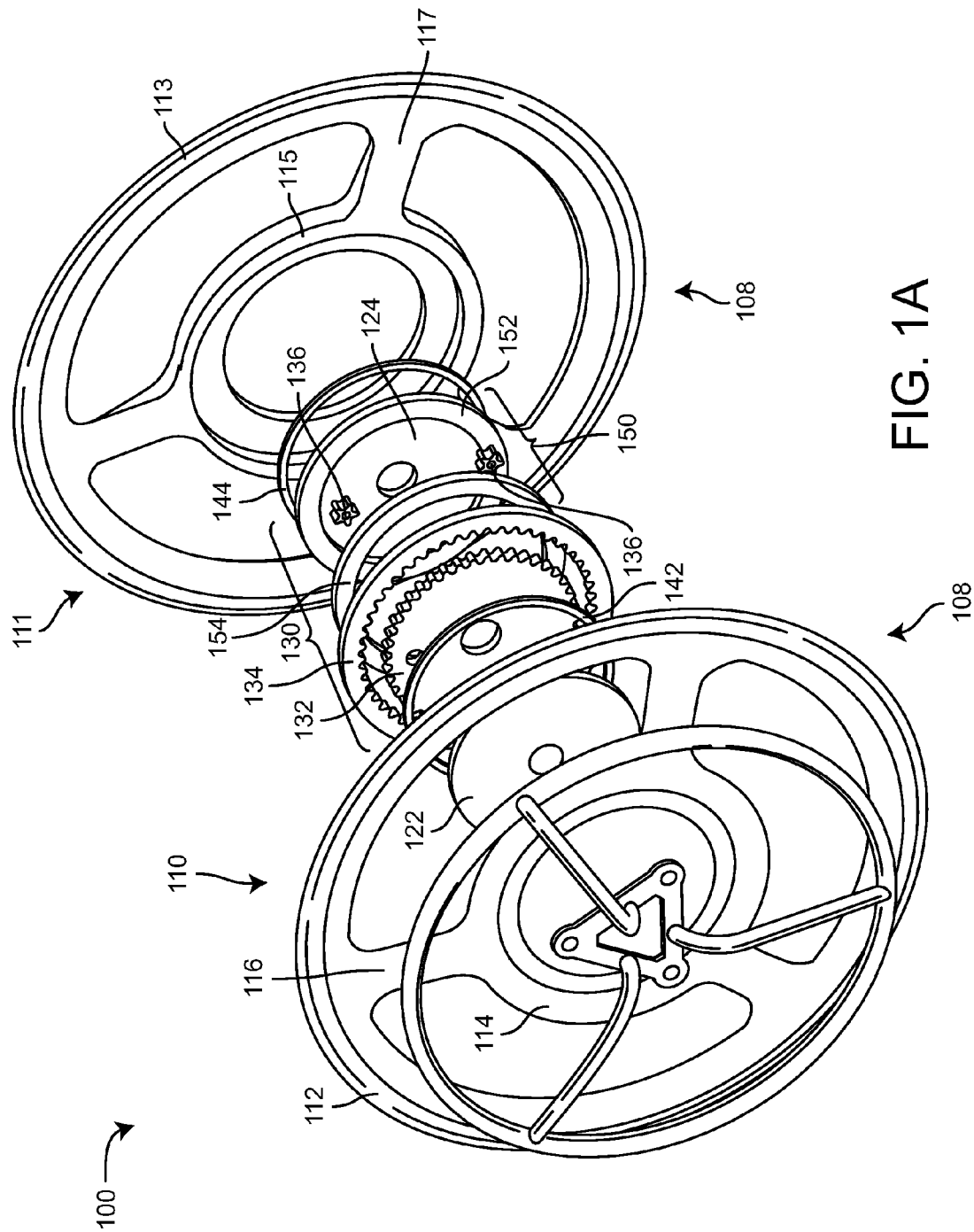

PROPULSION SYSTEMS FOR MANUALLY OPERATED MOBILITY DEVICES

CROSS-REFERENCE TO RELATED PATENT APPLICATIONS

The present application claims the benefit of and priority to U.S. Provisional Application No. 61/636,106, filed Apr. 20, 2012, the entirety of which is hereby incorporated by reference.

BACKGROUND

The present description relates generally to the field of propulsion systems for manually-operated mobility devices, such as manual wheelchairs, recumbent bicycles, and other manually-propelled mobility devices. More specifically, the present description relates to a propulsion system including a planetary gear system for propelling a manually-operated mobility device.

It is well known to provide mobility devices such as wheelchairs that are manually propelled by persons having certain physical injuries, disabilities or ailments. According to one estimate, there are approximately 1.8 million manual wheelchair users in the United States and the population is expected to grow at a rate of 10% annually. Studies have shown that long-term manual wheelchair users may be 50% more likely to suffer upper extremity muscle overuse. The effects of muscle overuse becoming evident in the forms of muscle pain, torn rotor cuffs, joint degeneration, and carpal tunnel syndrome. Studies have found that the continued prevalence and intensity of pain, over time, resulted in a change in lifestyle where the user ceased to routinely perform these activities. It would be desirable to minimize these types of injuries while retaining the benefits of the exercise that these devices and other manually operated mobility devices provide.

SUMMARY

One implementation of the present disclosure is a propulsion system for a manually-operated mobility device. The propulsion system includes a hand rim configured to receive a propulsion force from a user of the manually-operated mobility device, a wheel hub fixedly attached to a wheel for the manually-operated mobility device, and a planetary gear system including a sun gear, a ring gear, and one or more planetary gears disposed between the sun gear and the ring gear. In some embodiments, the one or more planetary gears are supported by a planet carrier. One of the sun gear and the ring gear is fixedly coupled to the hand rim and the other of the sun gear and the ring gear is fixedly coupled to the wheel hub.

In some embodiments, the hand rim is fixedly coupled to the sun gear and the wheel hub is fixedly coupled to the ring gear. Coupling the hand rim and the sun gear and coupling the wheel hub the ring gear may result in a high-gear arrangement in which a mechanical advantage is provided to a user of the manually-operated mobility device. In the high-gear arrangement a complete revolution of the hand rim results in a rotation of less than a complete revolution of the wheel hub. In other embodiments, the hand rim is fixedly coupled to the ring gear and the wheel hub is fixedly coupled to the sun gear. Coupling the hand rim to the ring gear and coupling the wheel hub the sun gear may result in a low-gear arrangement in which a complete revolution of the hand rim results in a rotation of more than a complete revolution of the wheel hub.

In some embodiments, the manually-operated mobility device is shiftable between a rowing propulsion mode in which the sun gear and the ring gear rotate in opposite directions and a pushing propulsion mode in which the sun gear and the ring gear rotate in unison.

In some embodiments, the propulsion system further includes a cam lever mechanism movable between an engaged position in which the cam lever mechanism rotatably fixes the planet carrier to a frame of the manually-operable mobility device and a disengaged position in which the cam lever mechanism permits rotation of the planet carrier relative to the frame and a quick-release pin movable between an engaged position in which the quick-release pin rotatably fixes the hand rim to the wheel hub and a disengaged position in which the quick-release pin permits rotation of the hand rim relative to the wheel hub. Shifting between the rowing propulsion mode and the pushing propulsion mode may be accomplished by disengaging one of the cam lever mechanism and the quick-release pin and engaging the other of the cam lever mechanism and the quick-release pin.

In some embodiments, the propulsion system further includes a coaxial shifter fixedly coupled to the hand rim. The coaxial shifter includes a first engagement pin extending from a first side of the coaxial shifter and a second engagement pin extending from a second side of the coaxial shifter. The coaxial shifter is movable between a first position in which the first engagement pin rotatably fixes the coaxial shifter to the sun gear and a second position in which the second engagement pin rotatably fixes the coaxial shifter to the wheel hub. Shifting between the rowing propulsion mode and the pushing propulsion mode may be accomplished by moving the coaxial shifter between the first position and the second position.

In some embodiments, the propulsion system further includes a locking mechanism for securing the coaxial shifter in the first position or the second position. The locking mechanism includes a trigger handle attached to the coaxial shifter via one or more spring-loaded pins. Squeezing the trigger handle unlocks the locking mechanism and permits movement of the coaxial shifter between the first position and the second position.

In some embodiments, the propulsion system further includes a shift collar fixedly coupled to the hand rim and having one or more radially extending dowel pins. The shift collar is movable between a first position in which the dowel pins engage one or more radially extending grooves in the sun gear (e.g., for rotatably fixing the shift collar to the sun gear) and a second position in which the dowel pins engage radially one or more extending grooves in the wheel hub (e.g., for rotatably fixing the shift collar to the wheel hub). Shifting between the rowing propulsion mode and the pushing propulsion mode may be accomplished by moving the shift collar between the first position and the second position.

In some embodiments, at least one of the shift collar, the sun gear, and the wheel hub include a magnetic element for securing the shift collar in the first position or the second position. For example, the shift collar may include one or more magnets configured to engage a metallic portion of the sun gear when the shift collar is in the first position and the wheel hub may include one or more magnets configured to engage a metallic portion of the shift collar when the shift collar is in the second position. In some embodiments, the magnets of the shift collar are disposed along an inboard-facing surface of the shift collar and the metallic portion of the sun gear is disposed along an outboard-facing surface of the sun gear. The magnets of the wheel hub may be disposed along an inner radial face of the wheel hub and the metallic portion of the shift collar may be disposed along an outer radial face of the shift collar.

In some embodiments, the propulsion system further includes a rotatable shifting mechanism configured to shift the planet carrier between a first position in which the planet carrier is rotatably fixed to a stationary axle of the manually-operated mobility device and a second position in which the planet carrier is rotatably fixed to the wheel hub. Shifting between the rowing propulsion mode and the pushing propulsion mode may be accomplished by shifting the planet carrier between the first position and the second position.

Another implementation of the present disclosure is an anti-rollback mechanism for a manually-operated mobility device. The anti-rollback mechanism includes a ratcheted hub rotatably coupled to a wheel of the manually-operated mobility device, an anti-rollback lever rotatable between an engaged position and a disengaged position, one or more pawls disposed between the anti-rollback lever and the ratcheted hub, and one or more leaf springs disposed between the one or more pawls and the anti-rollback lever. Rotation of the anti-rollback lever into the engaged position may cause the pawls to engage the ratcheted hub, thereby preventing the wheel from rotating in a backward direction. In some embodiments, the one or more pawls are rotatable about stationary axles extending from a flange fixedly attached to a frame of the manually-operated mobility device. Rotation of the anti-rollback lever into the engaged position may compress the one or more leaf springs, thereby causing the leaf springs to rotate the one or more pawls into engagement with the ratcheted hub.

Another implementation of the present disclosure is a rotatable shifting mechanism for a manually-operated mobility device. The rotatable shifting mechanism includes a turn shifter having shifter teeth extending from an outboard-facing surface thereof and one or more radially extending cams. The rotatable shifting mechanism further includes a turn shifter face having face teeth extending from an inboard-facing surface thereof. The turn shifter face is movable between an inboard position in which the face teeth engage the shifter teeth, thereby rotatably fixing the turn shifter face to the turn shifter, and an outboard position in which the face teeth do not engage the shifter teeth, thereby permitting rotation of the turn shifter face relative to the turn shifter. The rotatable shifting mechanism further includes a cam follower ring having one or more cam slots disposed along an inner radial surface thereof. The one or more cam slots of the cam follower ring may be configured to receive the one or more radially extending cams of the turn shifter. Rotation of the turn shifter relative to the cam follower ring may cause the one or more cams to move within the one or more cam slots, thereby causing lateral motion of the cam follower ring.

In some embodiments, the rotatable shifting mechanism further includes a spring disposed between the turn shifter face and the turn shifter. The spring may bias the turn shifter face toward the outboard position such that the face teeth do not engage the shifter teeth unless an inboard force is applied to the turn shifter face.

In some embodiments, the rotatable shifting mechanism further includes a shift ring fixedly attached to the cam follower ring and configured to engage a planet carrier of the manually-operated mobility device. The shift ring may be movable between a first position in which the planet carrier is rotatably fixed to a wheel hub of the manually-operated mobility device and a second position in which the planet carrier is rotatably fixed to a stationary axle of the manually-operated mobility device. Movement of the shift ring between the first position and the second position may shift the manually-operated mobility device between a rowing propulsion mode and a pushing propulsion mode. In some embodiments, the shift ring is fixed to the cam follower ring by one or more linking pins extending between the shift ring and the cam follower ring. The linking pins may extend through one or more holes in a hand rim hub rotatably fixed to a hand rim for imparting a propulsion force to the manually-operated mobility device.

In some embodiments, the rotatable shifting mechanism further includes a planet carrier spring disposed between the planet carrier and the wheel hub. The planet carrier spring may bias the planet carrier toward the stationary axle. The shift ring may engage the planet carrier by pressing on an outboard-facing surface of the planet carrier when the shift ring is moved into the first position, thereby shifting the planet carrier in an inboard direction and compressing the planet carrier spring. Moving the shift ring into the second position may allow the planet carrier spring to decompress, thereby shifting the planet carrier in an outboard direction and rotatably fixing the planet carrier to the stationary axle.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 1A is a drawing of a propulsion system for a manually-operated mobility device shown in a high gear arrangement, the propulsion system including a hand rim, a wheel hub, and a planetary gear system, according to an exemplary embodiment.

DETAILED DESCRIPTION

Figure 1B:
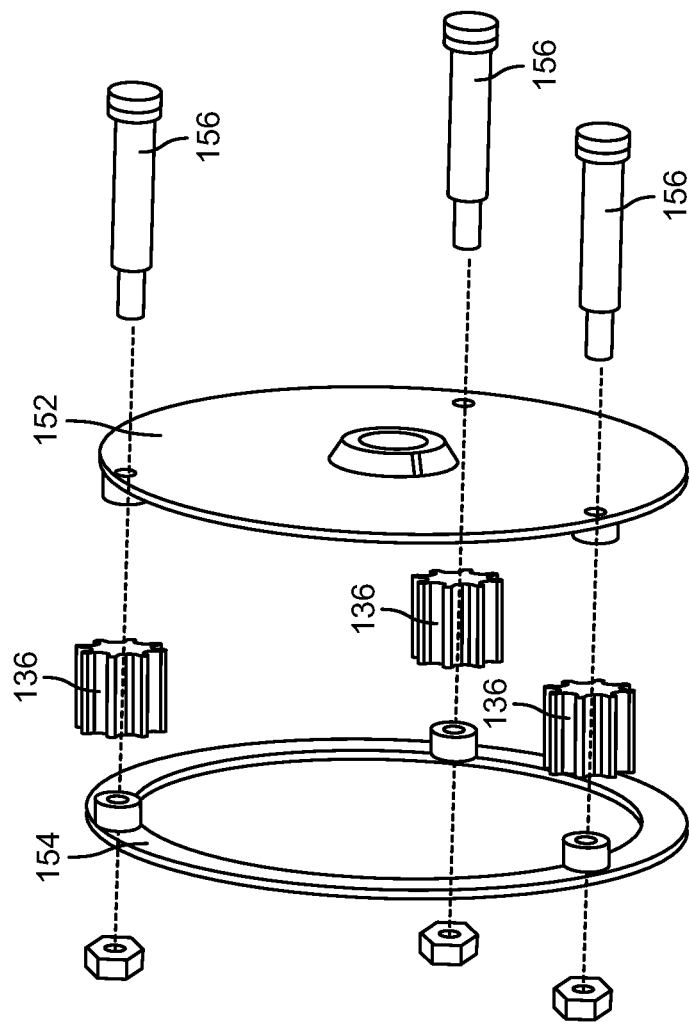
FIG. 1B is a drawing of a planet carrier for supporting one or more planetary gears of the planetary gear system, according to an exemplary embodiment.

Before discussing the details of the propulsion systems and/or the components thereof, it should be noted that references to "front," "back," "rear," "upward," "downward," "inner," "outer," "right," "left," "inboard," and "outboard" in this description are merely used to identify the various elements as they are oriented in the figures. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the communication of forces, stresses, momentum, or energy between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring generally to the figures, propulsion systems for a manually-operated mobility device and components thereof are shown according to various exemplary embodiments. The propulsion system described herein may be used in conjunction with manual wheelchairs, recumbent bicycles, and/or other manually-operated mobility devices.

The propulsion systems of the present disclosure use a fundamentally different approach to conventional manual wheelchair propulsion in that they operate by means of a pulling/rowing motion as opposed to a conventional pushing motion. Biomechanically, the propulsion systems of the present disclosure offer a direct and efficient solution to many problems associated with traditional wheelchair propulsion systems. For example, the propulsion systems described herein offer a solution to the problems of shoulder injuries, elbow injuries, wrist injuries, user fatigue, and poor maneuverability associated with conventional propulsion systems. The pulling/rowing motion used to operate the propulsion systems of the present disclosure transfers loads and stresses typically carried by relatively small and weak muscles in a user's shoulders and arms to larger and more capable muscles in a user's upper back, shoulders, and arms. This reallocation may considerably ease manual propulsion and reduce the likelihood of injuries to a user's shoulders, triceps, and wrists.

Advantageously, the propulsion systems of the present disclosure may have similar dimensions and a similar overall appearance to existing manual wheelchair wheels. In some embodiments, the described propulsion systems may be used in conjunction with any standard manual wheelchair by incorporating standard or universal parts where appropriate. In other embodiments, the described propulsion systems may include specialized, non-standard designs and/or configurations. Both embodiments are within the scope of this disclosure.

In some embodiments, the propulsion systems for a manually-operable mobility device include a hand rim or other suitable interface for a user to impart a propulsion force to one or more wheels of the mobility device. The hand rim may be coupled to a planetary gear system including a sun gear, a ring gear, and planetary gears disposed therebetween. The planetary gears may be supported by a planet carrier. In some embodiments, the planetary gear system is located within an inner hub of the wheel (e.g., between the wheel and the attached body of the mobility device). In other embodiments, the planetary gear system may be located elsewhere on or about the manually-operable mobility device (e.g., under or behind a seat, mounted about the device frame, etc.).

Advantageously, the planet carrier may be shiftable between a rowing/pulling propulsion mode in which the sun and ring gears rotate in opposite directions and a traditional pushing mode in which the sun and ring gears rotate in unison. Shifting from the rowing/pulling propulsion mode to the traditional propulsion mode may be accomplished by performing a two-step shifting process including. A first step of the two-step shifting process may involve disengaging the planet carrier from a frame of the mobility device such that the axes of the planetary gears are permitted to rotate about a central wheel axis. A second step of the two-step shifting process may involve fixedly securing the hand rim to the wheel hub such that rotation of the hand rim translates directly to motion of the attached wheel.

In some embodiments, the hand rim is connected to the sun gear and the wheel hub is connected to the ring gear to provide a "high-gear" arrangement. The high-gear arrangement may provide a mechanical advantage to the user (e.g. for traversing inclines or the like) such that one rotation of the hand rim results in less than a complete rotation of the wheel hub. In other embodiments, the hand rim is connected to the ring gear and the wheel hub is connected to the sun gear to provide a "low-gear" arrangement. The low-gear arrangement may increase cadence and/or provide for a faster acceleration.

In some embodiments, the propulsion system may include gear changing functionality (e.g., by packaging the sun and ring gears in replaceable/interchangeable cartridges, etc.) for reversing and/or or reorienting the relationship of the sun and the ring gear with respect to the hand rim and the wheel hub. The gear changing functionality may facilitate switching from a low-gear arrangement to a high-gear arrangement or between different gear ratios for adjusting the mechanical advantage characteristics of the propulsion system for a particular activity (e.g. exercise, rehabilitation, recreational or athletic activities, etc.).

Advantageously, the propulsion system may include any of a variety of shifting mechanisms such as a push-pull lever-type device or a rotatable shifting mechanism. One example of a rotatable shifting mechanism uses a spring-biased dial that can be pressed inwardly and turned in one direction to cam-shift the planet carrier out of engagement with the wheel hub and into engagement with a stationary axle. By disengaging the planet carrier from the wheel hub and engaging the planet carrier with a stationary axle, the mobility device may be shifted from the traditional propulsion mode to the rowing propulsion mode. The spring-biased dial can be pressed inwardly and turned in the opposite direction to cam-shift the planet carrier into engagement with the wheel hub and out of engagement with the stationary axle. By disengaging the planet carrier from the stationary axle and engaging the planet carrier with the wheel hub, the propulsion device may be shifted from the rowing propulsion mode to the traditional pushing propulsion mode.

In some embodiments, the propulsion system may include an anti-rollback mechanism to further assist with traversing inclines and the like. The anti-rollback mechanism may include a ratchet hub and spring-biased pawl components for preventing the mobility device from inadvertently or uncontrollably moving backwards. All of the components of the propulsion system may be mounted about a stationary wheel axle that disposed in an axle hub on the frame of the mobility device. The components of the propulsion system may be secured in a quick-release manner using a quill-stem mechanism. The quill-stem mechanism may hold the planet carrier in place relative to the wheel.

Referring now to FIG. 1A, a first arrangement 100 of a propulsion system for a manually-operated mobility device is shown, according to an exemplary embodiment. Arrangement 100 is shown to include a wheel rim 108 having an outboard rim 110 and an inboard rim 111. Rim 110 is shown to include an outer rim portion 112 and an inner rim portion 114. Outer rim portion 112 may be fixedly attached to inner rim portion 114 via spokes 116 extending radially between outer rim portion 112 and inner rim portion 114. Similarly, rim 111 is shown to include an outer rim portion 113 and an inner rim portion 115. Outer rim portion 113 may be fixedly attached to inner rim portion 115 via spokes 117 extending radially between outer rim portion 113 and inner rim portion 115. Outer rim portions 112,113 may include a tire around an outer perimeter thereof. Outboard rim 110 and inboard rim 111 may be combined (e.g., united, joined, fastened, etc.) to form a wheel rim 108 for the manually-operated mobility device.

Arrangement 100 is further shown to include an outboard casing 122 and an inboard casing 124 enclosing a planetary gear system 130. Outboard casing 122 may be fixedly attached to a hand rim 120 for imparting an input propulsion force (e.g., from a user) to the manually-operated mobility device. Outboard casing 122 and inboard casing 124 may serve as a housing for planetary gear system 130. In some embodiments, outboard casing 122 may fit within a circular recession of inner rim portion 114 and inboard casing 124 may fit within a circular recession in inner rim portion 115.

Planetary gear system 130 is shown to include a sun gear 132, a ring gear 134, and one or more planetary gears 136. Sun gear 132 may be fixedly attached to hand rim 120 (e.g., via bolts, screws, rivets, or other fasteners) such that rotation of hand rim 120 causes an equal rotation of sun gear 132. Ring gear 134 may be fastened to wheel rim 108 (e.g., along inner rim portions 114,115) such that rotation of ring gear 134 causes an equal rotation of wheel rim 108. Planetary gears 136 may be positioned between sun gear 132 and ring gear 134. The teeth of planetary gears 136 may engage both sun gear 132 and ring gear 134 for rotatably coupling sun gear 132 to ring gear 134.

Referring now to FIG. 1B, planetary gears 136 may be supported by a planet carrier 150 having an inboard carrier plate 152 and an outboard carrier plate 154. Planetary gears 136 may be rotatable about axes 156 (e.g., bolts, rods, pins, etc.) extending between inboard carrier plate 152 and outboard carrier plate 154. Planet carrier 150 may be attached to a frame of the manually-operated mobility device such that planetary gears 136 rotate about stationary axes.

In some embodiments, outboard casing 122 and inboard casing 124 each include a circular inner portion and an annular outer portion. The inner portion of inboard casing 122 may be coupled to inboard planet carrier plate 152. In some embodiments, the inner portion of inboard casing 122 may be integrally formed with inboard planet carrier plate 152. The outer portions of inboard casing 122 and outboard casing 124 may be fixed to inner rim portions 114 and 115 respectively. Large bore diameter, small cross-section bearings 142,144 are positioned between the inner portions and outer portions of casings 122,124. Bearings 142 may facilitate rotation between outboard casing 122 and wheel rim 110. Bearing 144 may facilitate rotation between inboard casing 124 and wheel rim 111.

Figure 2:
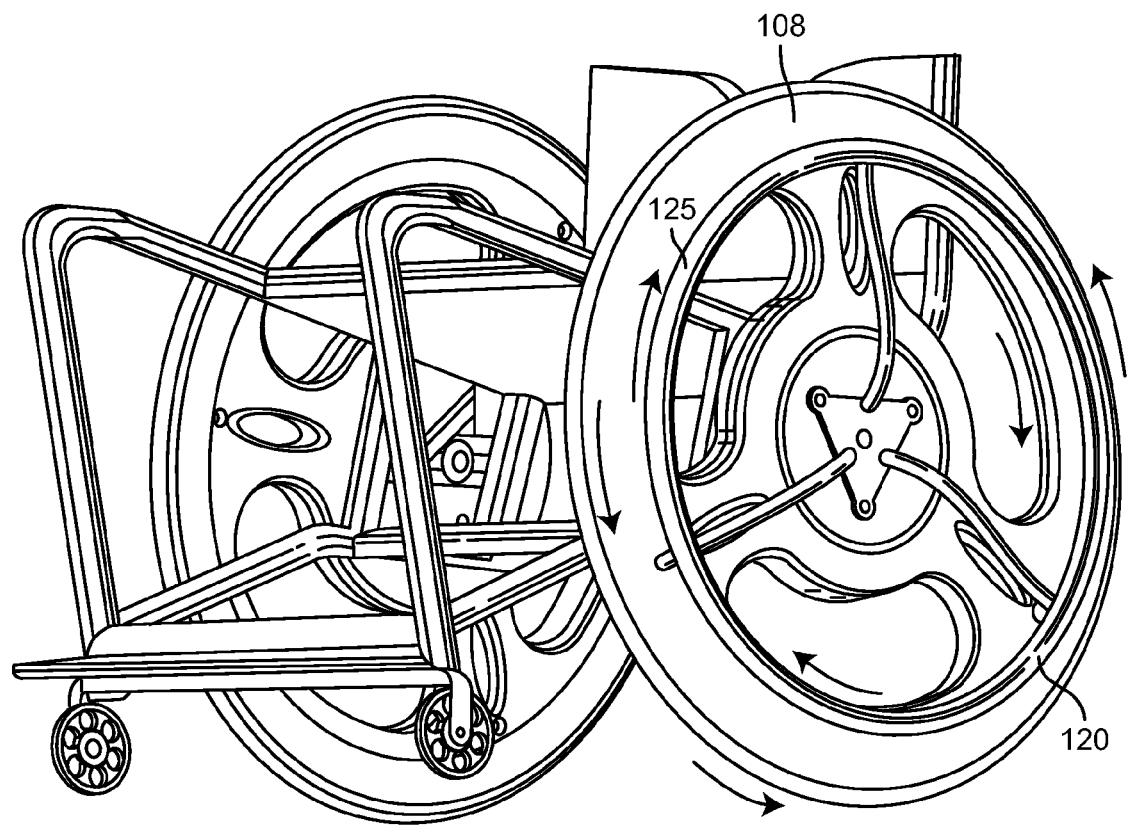
FIG. 2 is a drawing of a manually-operated mobility device illustrating the opposite rotations of the hand rim and the wheel hub as a result of the planetary gear system coupling the hand rim to the wheel hub, according to an exemplary embodiment.

Referring now to FIG. 2, advantageously, a user can effect forward motion of the manually-operated mobility device by pulling upward on a front-facing segment 125 of hand rim 120 (e.g., in a "rowing" or pulling motion). In a conventional wheelchair system, such a pulling motion would cause the chair to move backward. However, in arrangement 100, such a pulling motion causes the manually-operated mobility device to move forward via the configuration of planetary gear system 130. For example, the pulling motion causes sun gear 132 to rotate in a backward direction along with hand rim 120. The backward rotation of sun gear 132 is translated into a forward rotation of ring gear 134 via the rotational coupling of planetary gears 136.

Arrangement 100 is shown as a "high-gear" arrangement in which each revolution of hand rim 120 results in a lesser number of revolutions of wheel 108 (e.g., in an opposite direction). High-gear arrangement 100 also amplifies the output torque (e.g., transmitted to 108) relative to the input torque (e.g., exerted by a user via hand rim 120) through the mechanical advantage offered by arrangement 100. Additionally, arrangement 100 requires less force per hand strokes on wheel rim 120 to traverse a given distance by using sun gear 132 as the input and ring gear 134 as the output while keeping planet carrier 150 fixed. Advantageously, pulling hand rim 120 in a rowing motion reduces the effort needed to turn wheel 108 compared to conventional wheelchair wheels, which are moved with a pushing motion.

Referring now to FIGS. 3A-3E, a shifting device 200 for switching between a rowing/pulling propulsion mode (e.g., arrangement 100) and a traditional pushing propulsion mode is shown, according to an exemplary embodiment. Alternating between the two propulsion modes provides added flexibility in allowing a user to alternate between exercising the different associated muscle groups, without having to change wheels. Shifting device 200 is shown to include a cam lever mechanism 210 and a quick-release pin 220.

Figure 3A:
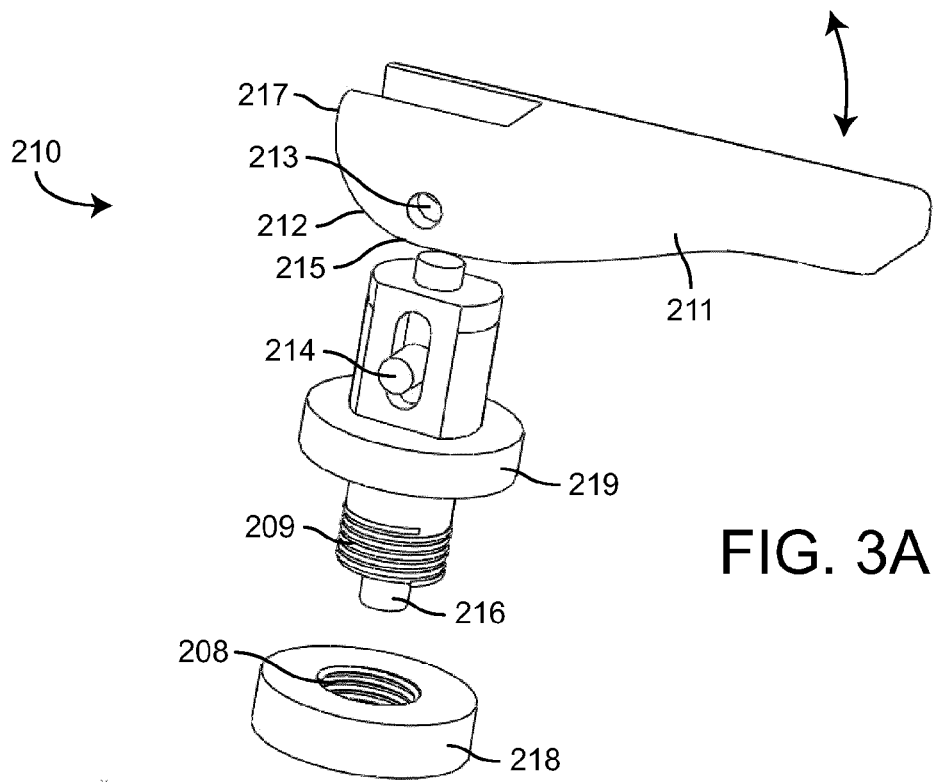
FIGS. 3A-3E are drawings of a shifting device for transitioning the propulsion system between a traditional pushing propulsion mode and a rowing or pulling propulsion mode, the shifting device including a cam lever mechanism for releasably coupling the planet carrier to a frame of the manually-operated mobility device and a quick release pin for releasably coupling the hand rim to the wheel hub, according to an exemplary embodiment.
Figure 3B:
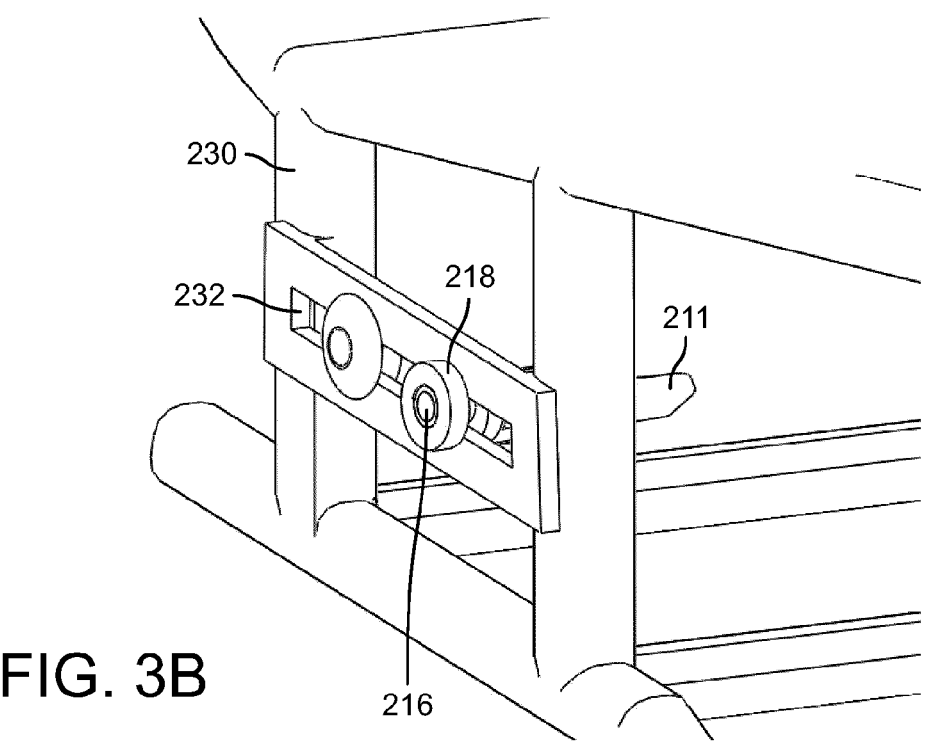
Figure 3C:
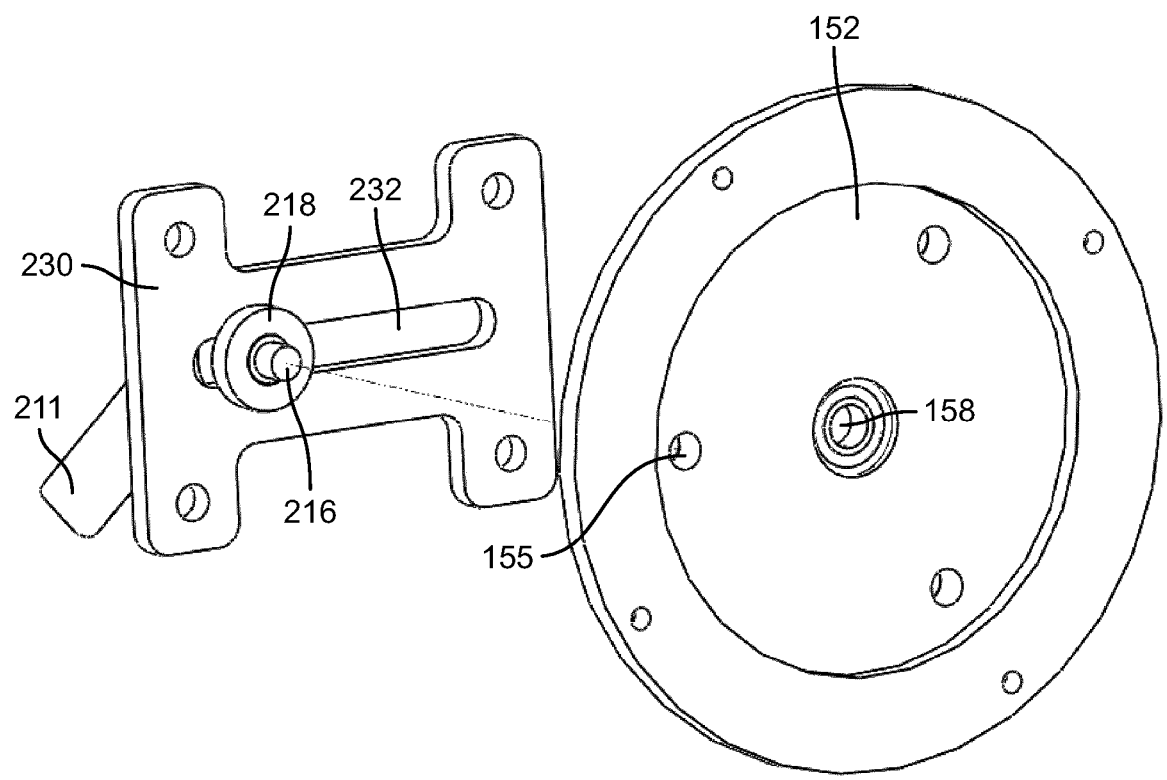

Referring specifically to FIGS. 3A-3C, cam lever mechanism 210 is shown to include a lever 211 having a curved edge 212 and a pin hole 213. Lever 211 may be rotatable about a pin 214 inserted through pin hole 213. Pin hole 213 may be located relative to curved edge 212 such that the distance between pin hole 213 and end 215 is less than the distance between pin hold 213 and end 217. Pin 214 may be supported by a pin holder 219 such that an end 216 of pin 214 protrudes from pin holder 219. Pin holder 219 is shown to include a threaded portion 209 configured to engage threads 208 along an interior surface of fastener 218.

Cam lever mechanism 210 may be secured to a frame 230 of the manually-operated mobility device by inserting threaded portion 209 through a slot 232 in frame 230. Fastener 218 may be threaded onto threaded portion 209 for fixing cam lever 210 in a stable position. Cam lever 211 may be rotatable between an engaged position (shown in FIGS. 3A and 3C) and a disengaged position (shown in FIG. 3B). When cam lever 211 is in the engaged position, pin end 216 may protrude from an outward-facing surface of fastener 218. Pin end 216 may engage a hole 155 formed in inboard carrier plate 152 of planet carrier 150. When engaged, pin end 216 may prevent planet carrier 150 from rotating, thereby holding the axes 156 (e.g., axes of rotation for planetary gears 136) in a fixed position. When cam lever 211 is in the disengaged position, pin end 216 may be coplanar with the outward-facing surface of fastener 218. A user may disengage pin end 216 from hole 155 by rotating cam lever 211 from the engaged position into the disengaged position. When disengaged, planet carrier 150 may be free to rotate about a central axis 158.

Figure 3D:
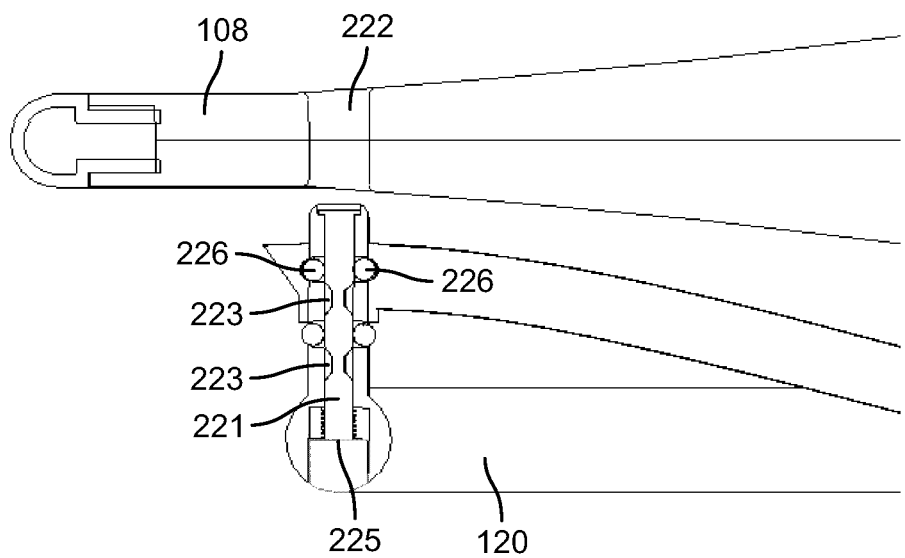
Figure 3E:
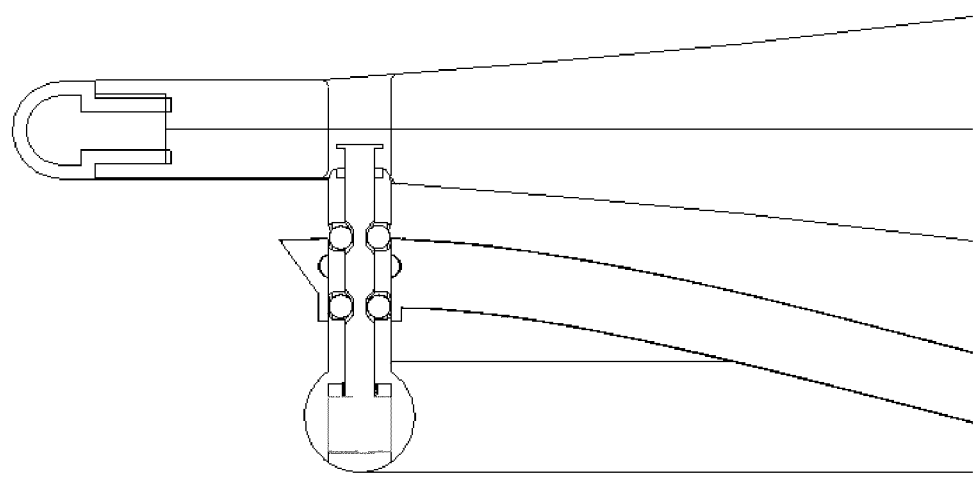

Referring specifically to FIGS. 3D-3E, quick-release pin 220 is shown to include a pin 221 having circular (e.g., 360 degree) grooves 223 and a quick-release button 225. Pin 220 may be mounted on a portion of hand rim 120 and movable between a disengaged position (shown in FIG. 3D) and an engaged position (shown in FIG. 3E). A user may releasably couple hand rim 120 to wheel 108 by pressing quick-release button 225. By pressing button 225, pin 221 is forced toward wheel 108 and engages a pin slot 222 formed along an outward-facing surface of wheel 108. Once pin 221 engages pin slot 222, button 225 may be released. Balls 226 may engage grooves 223 for holding pin 221 in an engaged position. By coupling hand rim 120 to wheel 108, the manually-operated mobility device may be operated in a conventional "forward pushing" fashion. Disengaging planet carrier 150 from frame 230 allows planetary gears 136 to rotate about central axis 158 along with sun gear 132 and ring gear 134.

Figure 4A:
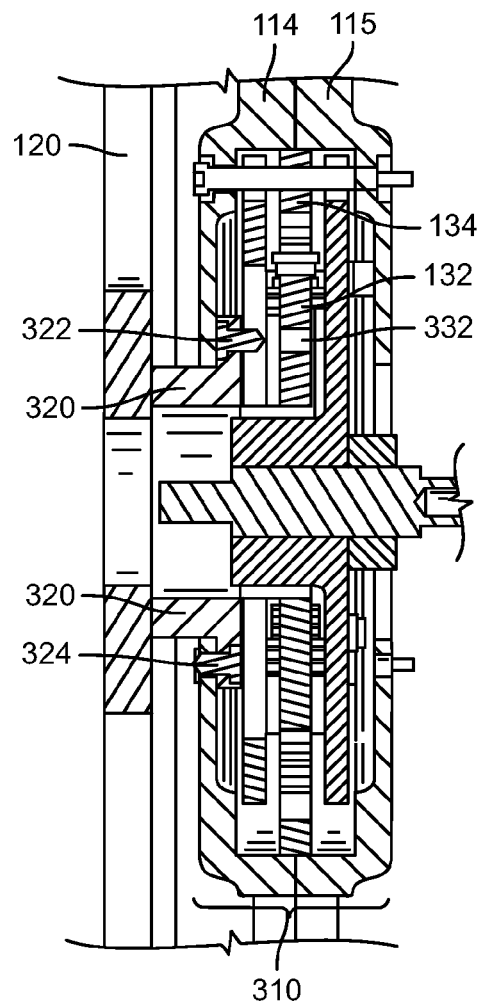
FIGS. 4A-4B are drawings of another shifting device for transitioning the propulsion system between the pushing propulsion mode and a rowing propulsion mode, the shifting device including a shift collar coupled to the hand rim and configured to engage either the wheel hub in the pushing propulsion mode or a sun gear of the planetary gear system in the rowing propulsion mode, according to an exemplary embodiment.
Figure 4B:
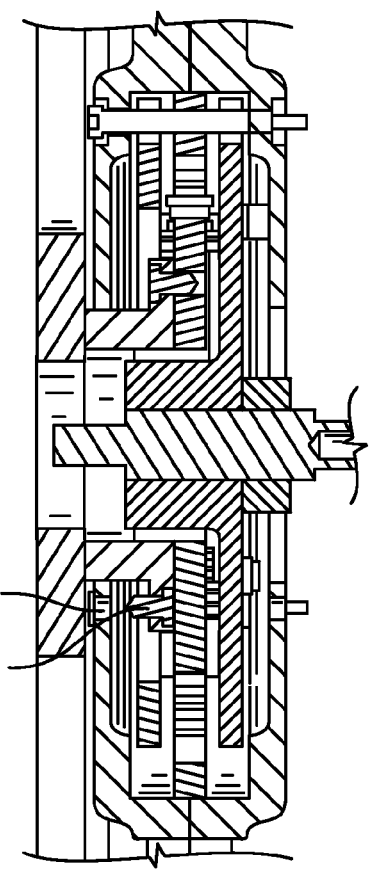

Referring now to FIGS. 4A and 4B, an alternate shifting device 300 for switching between a rowing/pulling propulsion mode and a traditional pushing propulsion mode is shown, according to an exemplary embodiment. Shifting device 300 is shown to include a coaxial shifter 320 fixedly attached to hand rim 120. Coaxial shifter 320 and hand rim 120 may be movable along an axis of rotation of hand rim 120 (e.g., from left to right in FIGS. 4A and 4B). In some embodiments, hand rim 120 and coaxial shifter 320 are moved approximately ⅜ inch between the rowing mode and the traditional pushing mode. Coaxial shifter 320 is shown to include engagement pins 322,324 extending from opposite sides of coaxial shifter 320. Engagement pin 322 may be configured to fit within a receiving hole 322 in sun gear 132. Engagement pin 324 may be configured to fit within a receiving hole 334 in wheel hub 320. Wheel hub 310 may include inner rims 114,115 and may be fixedly attached to an outer rim of wheel 108.

Referring specifically to FIG. 4A, coaxial shifter 320 and hand rim 120 are shown in an outboard position (e.g., shifted to the left in FIG. 4A). The outboard position corresponds to a traditional pushing propulsion mode. In the outboard position, engagement pin 324 engages receiving hole 334, thereby fixing coaxial shifter 320 and hand rim 120 to wheel hub 310. Consequently, rotation of hand rim 120 in a forward direction results in a forward rotation of wheel hub 310. In the traditional pushing mode, hand rim 120 is coupled to wheel hub 310. Forward motion is achieved by rotating hand rim 120 using by a pushing movement that bypasses the mechanical advantage of the planetary gear system, resulting in a 1:1 effort ratio. Advantageously, by not engaging sun gear 132 in the outboard position, it may be unnecessary to decouple planet carrier 150 from frame 230 when shifting into the traditional pushing propulsion mode.

Referring specifically to FIG. 4B, coaxial shifter 320 and hand rim 120 are shown in an inboard position (e.g., shifted to the right in FIG. 4B). The inboard position corresponds to a rowing propulsion mode. To shift into the rowing propulsion mode, a user may pull hand rim 120 in an inward direction, thereby removing engagement pin 324 from receiving hole 334 and inserting engagement pin 322 into receiving hole 332. In the inboard position, hand rim 120 and coaxial shifter 320 are fixed to sun gear 132. Sun gear 132 may be rotatably linked with ring gear 134 via one or more planetary gears as described in reference to FIG. 1 (e.g., rotation of sun gear 132 in a first direction causes rotation of ring gear 134 in an opposite direction). Ring gear 134 may be fixedly attached to wheel hub 310 such that wheel 108 rotates along with ring gear 134.

In some embodiments, a large bearing is provided between sun gear 132 and planet carrier 150, allowing sun gear 132 to revolve with minimal friction relative to stationary carrier 150. Smaller bearings may be provided circumferentially on wheel hub 310 (e.g., mounted on shafts/bolts between planet carrier 150 and wheel hub 310), thereby allowing for relative motion between wheel hub 320 and planet carrier 150.

Figure 5A:
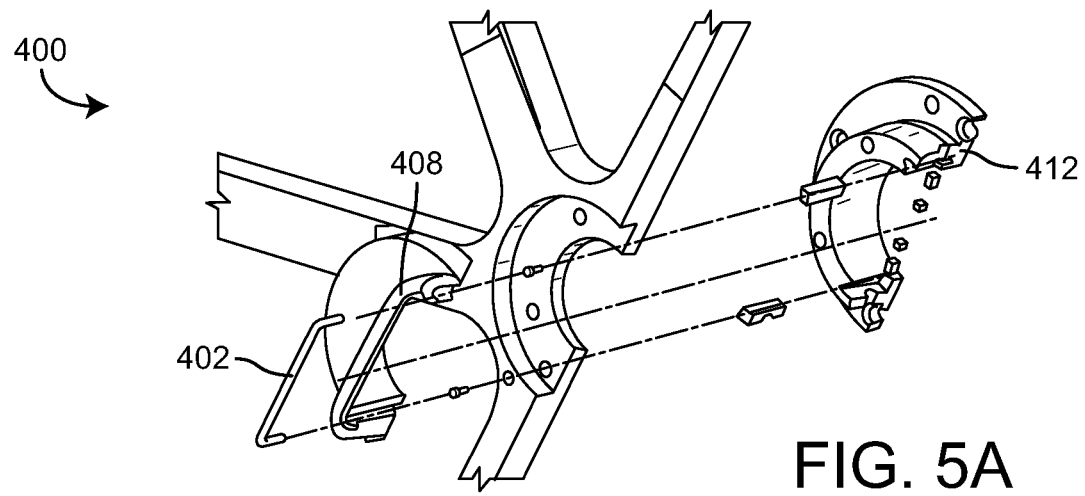
FIGS. 5A-5B are drawings of a locking mechanism for the shifting device of FIGS. 4A-4B, the locking mechanism preventing inadvertent shifting between the pushing propulsion mode and the rowing propulsion mode, according to an exemplary embodiment.
Figure 5B:
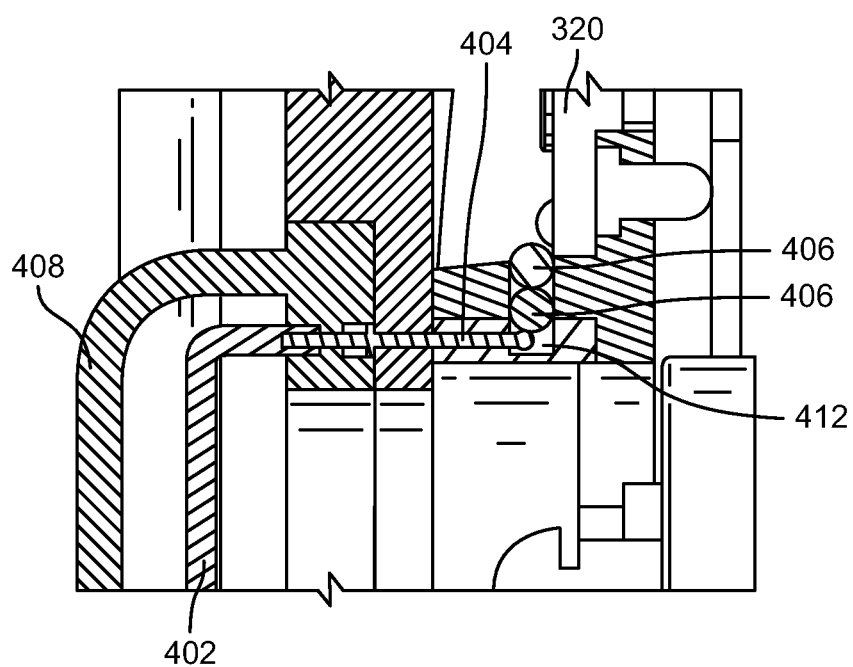

Referring now to FIGS. 5A and 5B, a locking mechanism 400 for locking the propulsion system in a desired propulsion mode is shown according to an exemplary embodiment. Locking mechanism 400 is intended to keep hand rim 120 engaged in either of the two propulsion methods (i.e. the rowing/pulling propulsion mode, and the traditional pushing mode). Locking mechanism 400 is intended to minimize the possibility that a user may, inadvertently, apply a lateral load significantly large enough to disengage coaxial shifter 320 from wheel hub 310 or sun gear 132.

Locking mechanism 400 is shown to include a trigger handle 402 attached to spring-loaded pins 404 at each end of handle 402. Spring-loaded pins 404 may push on ball bearings 406 which push on bottom rounded pin 410. Bottom rounded pin 410, when pushed by ball bearings 406, prevents shift collar 320 from disengaging from its current propulsion mode. For a user to disengage locking mechanism 400, the user may place his or her palm against rim cap handle 408. The user may then pull trigger handle 402 toward rim cap handle 408, thereby compressing the springs in spring-loaded pins 404 and moving an end of spring-loaded pins 404 in an outward-facing direction (e.g., to the left in FIG. 5B). The movement of spring-loaded pins 404 in an outward direction may allow ball bearings 406 to move completely into slot 412 (e.g., into a space previously occupied by spring-loaded pins 404). The user may maintain handle trigger 402 in an unlocked position while pushing or pulling on coaxial shifter 320, thereby shifting into the desired propulsion mode.

Figure 6A:
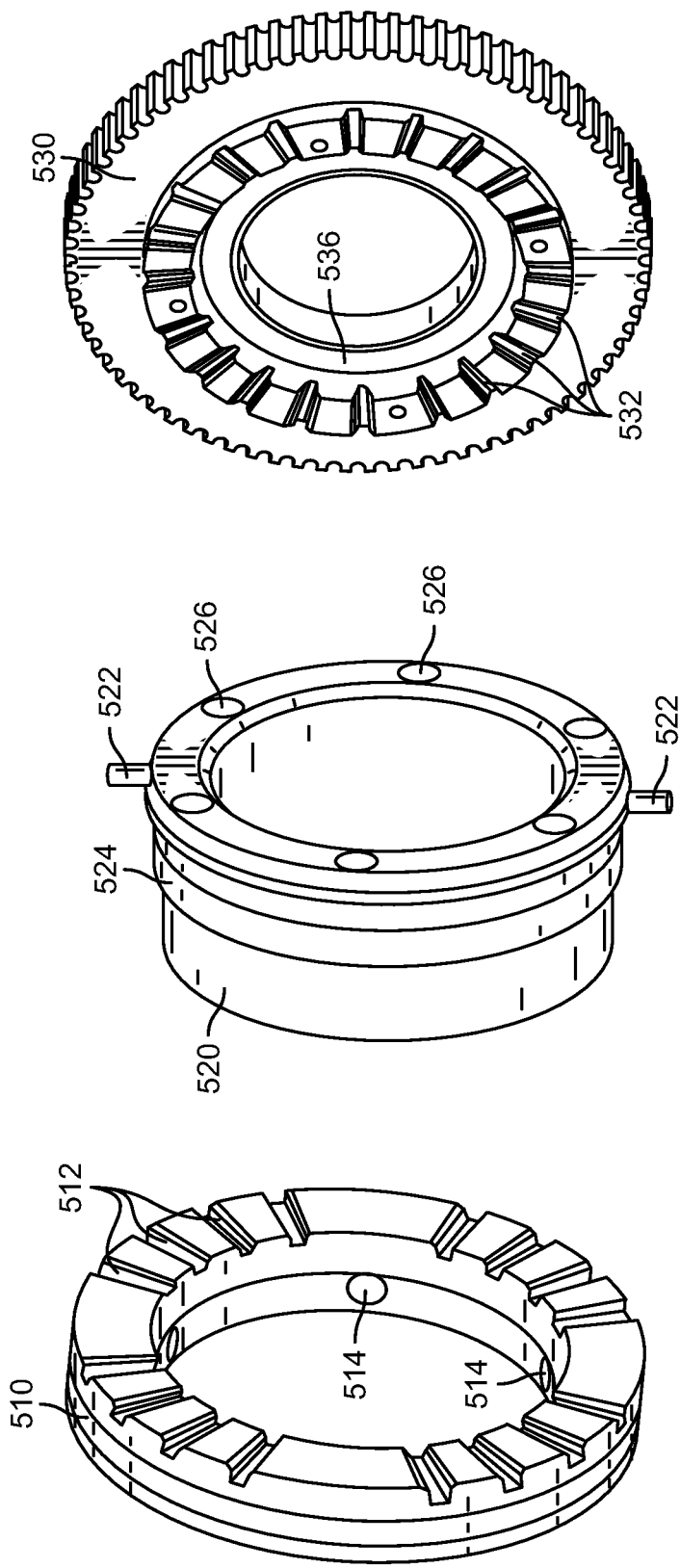
FIGS. 6A-6C are drawings of another shifting device and locking mechanism for transitioning the propulsion system between a traditional pushing propulsion mode and a rowing or pulling propulsion mode, the shifting device including a shift collar having a pair of radially extending dowel pins configured to engage radially grooves in either the wheel hub in the pushing propulsion mode or the sun gear in the rowing propulsion, and the locking mechanism including magnets for holding the shift collar in a desired position, according to an exemplary embodiment.
Figure 6B:
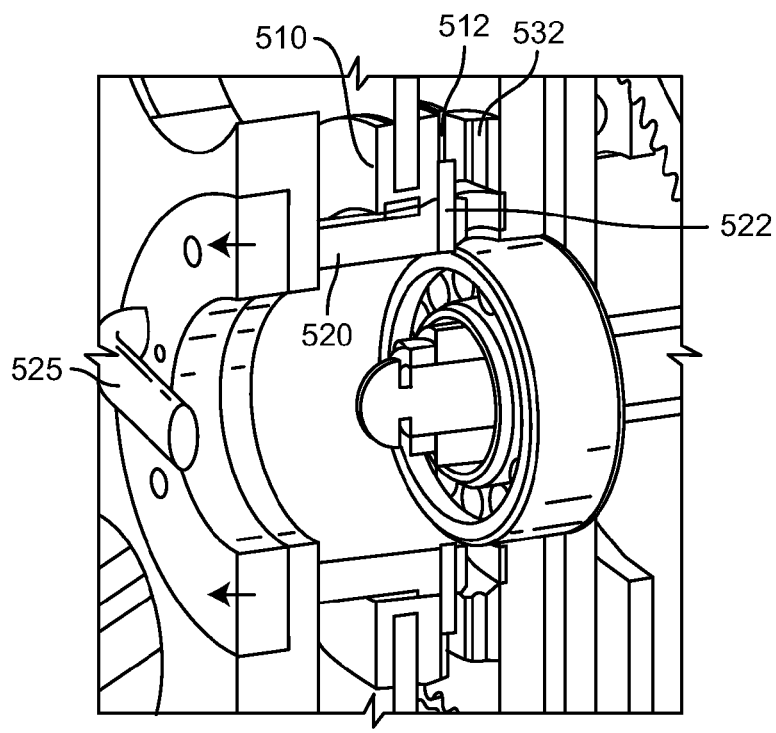
Figure 6C:
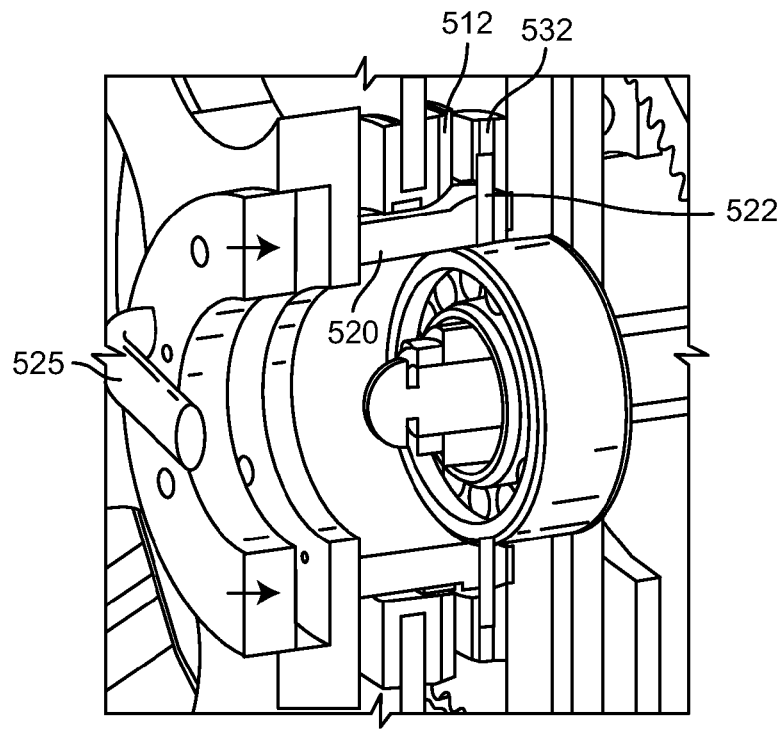

Referring now to FIGS. 6A-6C, another mechanism 500 for shifting and locking the manually-operated mobility device in a desired propulsion mode is shown, according to an exemplary embodiment. Mechanism 500 is shown to include a shift collar 520 positioned between an outboard disc 510 and sun gear 530. Shift collar 520 may be fixedly attached to a collar handle 525 used to move shift collar 520 between an outboard position (shown in FIG. 6B) and an inboard position (shown in FIG. 6C). Shift collar 520 may also be fixedly attached to hand rim 120 such that rotation of hand rim 120 causes an equal rotation (e.g., in a same direction) of shift collar 520. Outboard disc 510 may be fixedly attached to an inner wheel hub (e.g., wheel hub 320) or otherwise secured to wheel 108. Sun gear 530 may be a sun gear of a planetary gear system as described in reference to FIG. 1. Shift collar 520, sun gear 510, and outboard disc 530 may be formed of aluminum or other suitable materials. In some embodiments, both outboard disc 510 and sun gear 530 may include a catch ring with a radial taper to keep shift collar 520 aligned.

Shift collar 520 is shown to include dowel pins 522 extending radially from an outer surface of shift collar 520. In some embodiments, shift collar 520 includes two dowel pins 522 spaced 180 degrees apart. In the rowing propulsion mode, dowel pins 522 may engage radially extending grooves 532 in sun gear 530, thereby coupling hand rim 120 to sun gear 530. In the traditional pulling propulsion mode, dowel pins 522 may engage radially extending grooves 512 in outboard disc 510, thereby coupling hand rim 120 directly to wheel 108.

In some embodiments, shift collar 520 includes one or more magnetic discs 526 spaced about an inboard-facing surface of shift collar 520. Magnetic discs 526 may be rare earth magnets (e.g., neodymium magnets, naturally occurring magnets, etc.) or other materials having induced magnetic properties. Magnetic discs 526 may be configured to engage a metallic strip 536 along an outboard-facing surface of sun gear 530 for retaining shift collar 520 in the rowing propulsion mode. Shift collar 520 may further include a metallic strip 524 along an outer radial face thereof. Metallic strip 524 may be configured to engage one or more magnetic discs 514 located about an inner radial face of outboard disc 510 for retaining shift collar 520 in the traditional propulsion mode.

According to one embodiment, each of magnetic discs 514,526 has dimensions of approximately 1/8" diameter and 1/32" thickness. A pulling force of approximately 1.35 lbf may be sufficient to separate each of magnetic discs 514,526 from metallic strips 524,536 respectively. According to one embodiment, magnetic discs 514 and magnetic discs 526 may both include between 4-6 magnetic discs. Consequently, a separation force of approximately 6.5 lbf may be sufficient to disengage magnetic discs 514 from metallic strip 524 and to disengage magnetic discs 526 from metallic strip 536. This separation force may prevent shift collar 520 from inadvertently disengaging from outboard disc 510 or sun gear 530.

Figure 7A:
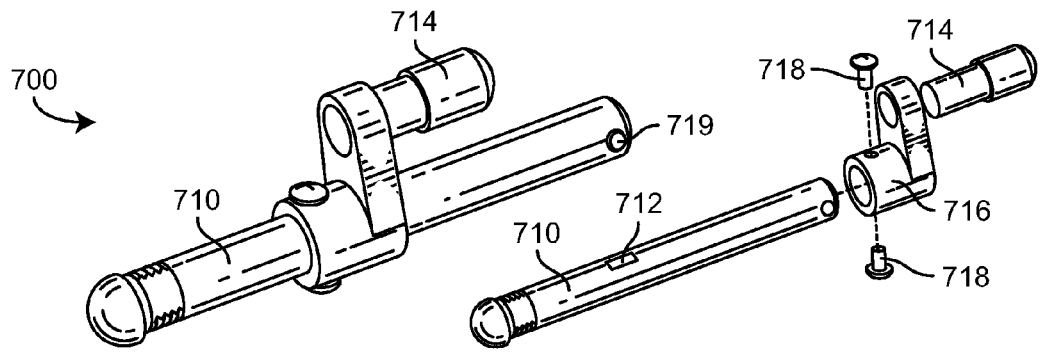
FIGS. 7A-7C are drawings of a quick release axle configured to fixedly attach to the planet carrier and releasably attach to a frame of the manually-operated mobility device for releasably coupling the planet carrier to the frame, according to an exemplary embodiment.
Figure 7B:
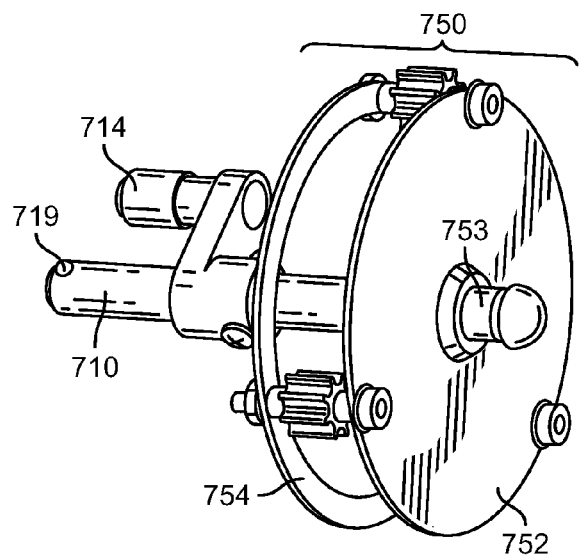
Figure 7C:
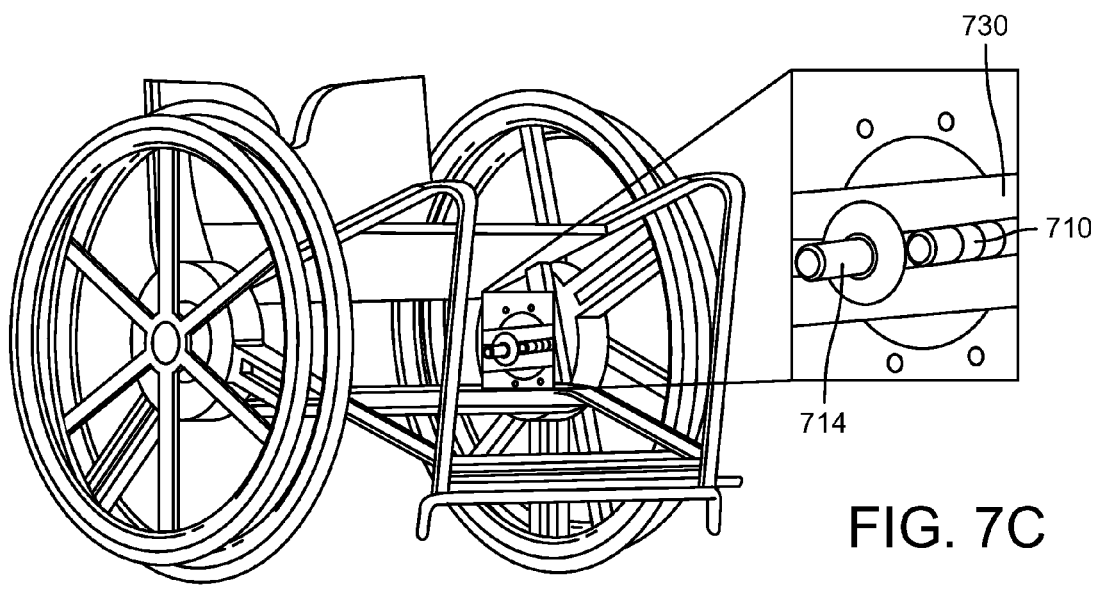

Referring now to FIGS. 7A-7C, a planet carrier locking axle assembly 700 for use with the propulsion system for a manually-operated mobility device is shown, according to an exemplary embodiment. A quick release axle 710 is provided as an alternative to a tapered axle to quickly and easily engage and disengage planet carrier 750 from a fixed frame of the manually-operated mobility device. Quick-release axle 710 is shown to include two small grooves 712 along its length and a dowel pin 714 along with a lock pin guide 716. Quick-release axle 710 may be held in place by two set screws 718 that go through lock pin guide 716 into grooves 712.

As shown in FIG. 7B, quick-release axle 710 may be fixedly attached to planet carrier 750. Axle 710 is shown extending between an inboard carrier plate 754 and an outboard carrier plate 752. Outboard carrier plate 752 is shown to include a central opening 753 (e.g., slot, aperture, hole, etc.) configured to receive quick-release axle 710. Opening 753 may have a diameter smaller than the diameter of quick-release axle 710, such that quick-release axle 710 is coupled to the planet carrier 750 with a press fit (e.g. interference fit).

Referring specifically to FIG. 7C, quick-release axle 710 and dowel pin 714 may releasably secure assembly 700 to a fixed frame 730 of the manually-operated mobility device. Dowel pin 714 is preferably sized to fit snuggly inside the wheelchair axle slot, thereby locking planet carrier 750 in place and preventing planet carrier 750 from rotating. In some embodiments, quick-release axle 710 may include a release button 719 which, when pressed, allows axle 710 to rotate relative to lock pin guide 716. Button 719 may be pressed as a means for decoupling planet carrier 750 from frame 730 when shifting between the rowing propulsion mode and the traditional propulsion mode.

Figure 8A:
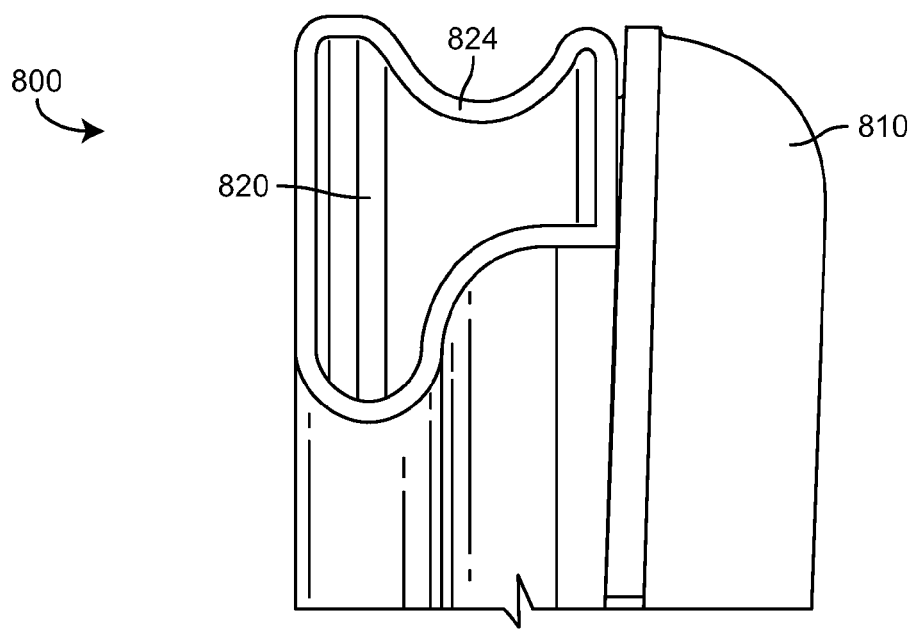
FIGS. 8A-8B are drawings of an ergonomic hand rim for the manually-operated mobility device, according to an exemplary embodiment.
Figure 8B:
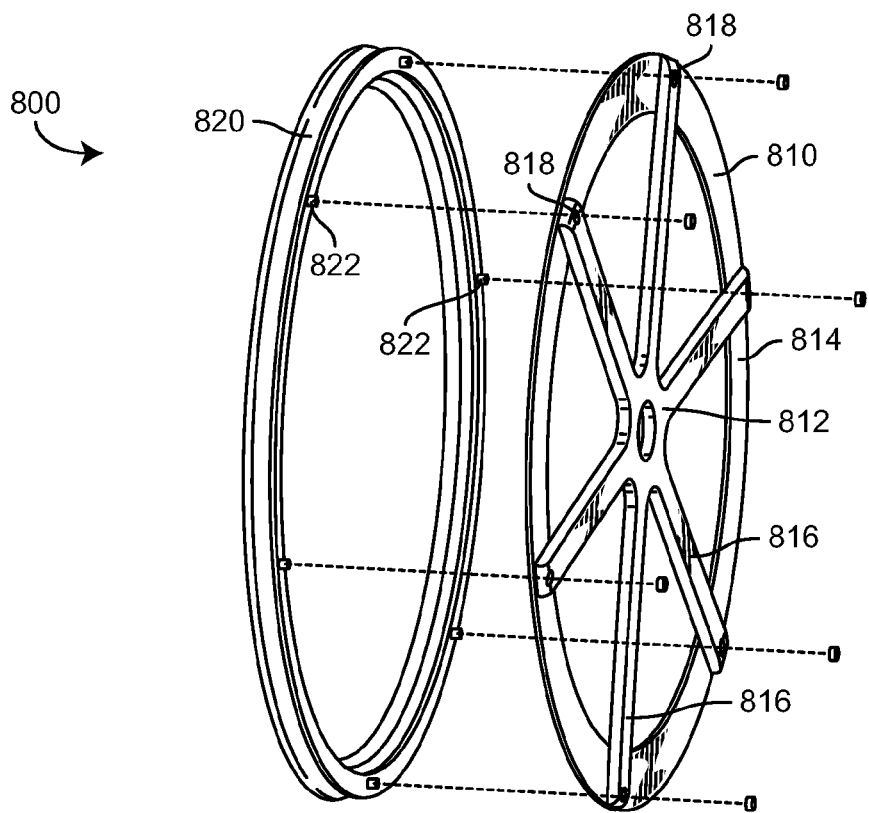

Referring now to FIGS. 8A-8B, an ergonomic hand rim 800 for use with the propulsion system for a manually-operated mobility device is shown, according to an exemplary embodiment. Ergonomic hand rim 800 is shown as a two piece assembly having a base 810 coupled to an ergonomically shaped hand grip 820. Base 810 is shown to include an inner hub 812 fixedly attached to an outer rim 814 by radially extending spokes 816. Hand grip 820 is shown to include a series of pegs 822 configured to fit with corresponding openings 818 along outer rim 814 for fastening hand grip 820 to base 810.

Advantageously, hand grip 820 has an ergonomic shape which reduces the total gripping force necessary to propel the manually-operated mobility device. Hand grip 820 reduces the total gripping force (e.g., a normal force applied between a user's hand and hand grip 820) by increasing the surface area 824 of hand grip 820 in contact with the user's hand (e.g., relative to a standard circular hand rim). The increased surface area 824 allows a user to apply less gripping force while still maintaining a sufficient grip (e.g., a friction force between the user's hand and hand rim 820) on hand rim 820. Decreasing the gripping force need to propel the manually-operated mobility device is intended to reduce pain and fatigue in the hands and wrists and also serves for better control when braking. In the rowing/pulling propulsion mode, spokes 816 are turning towards the user as the users hands are moving in the opposite direction for the next pull. In some embodiments, a finger protector piece may be provided on base 810 to protect the user's hand from being impacted by spokes 816.

Figure 9:
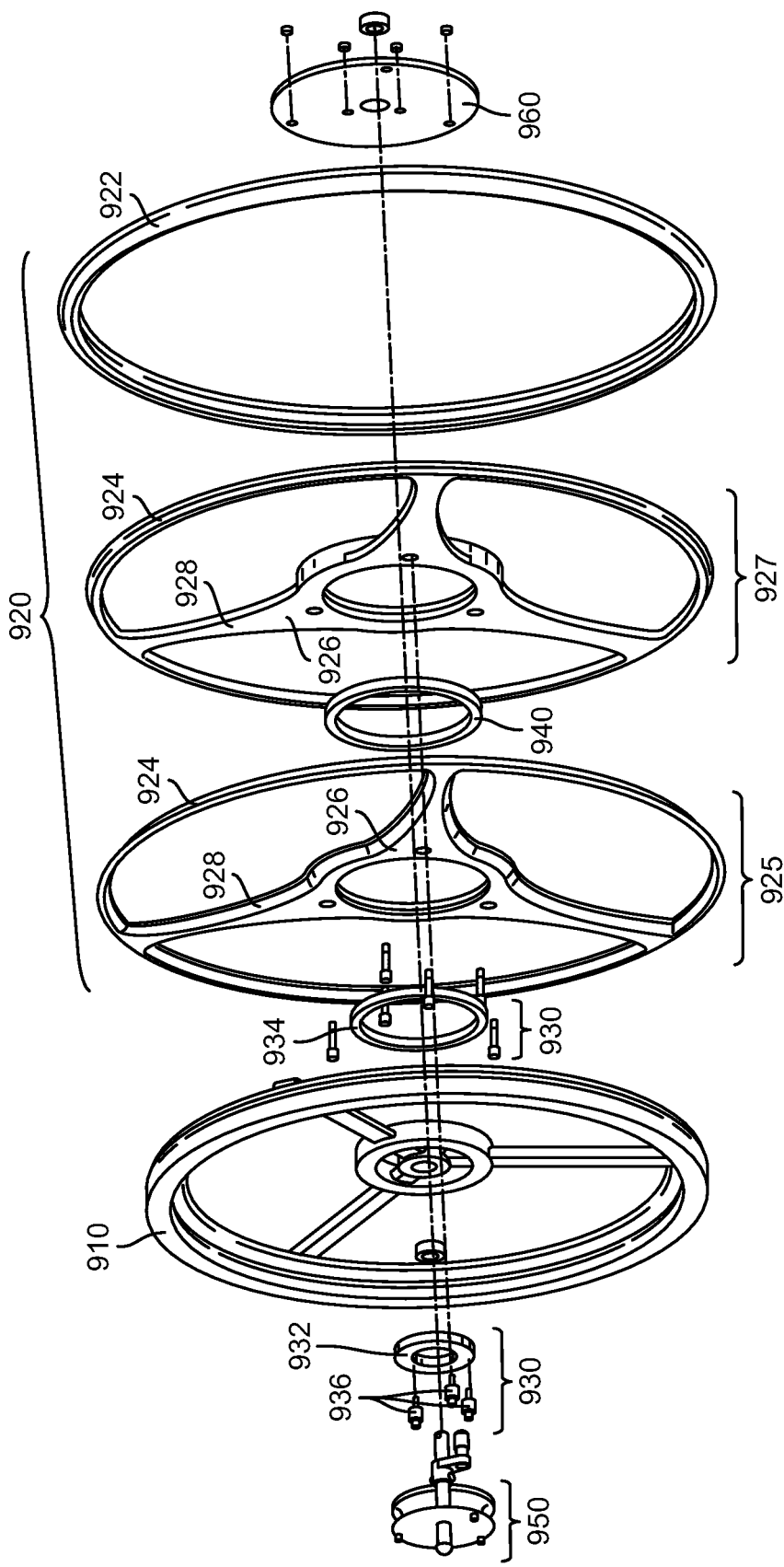
FIG. 9 is a drawing of a propulsion system for a manually-operated mobility device shown in a low gear arrangement, the propulsion system including a hand rim, a wheel hub, and a planetary gear system, according to an exemplary embodiment.

Referring now to FIG. 9, an alternate arrangement 900 of a propulsion system for a manually-operated mobility device is shown, according to an exemplary embodiment. Arrangement 900 is shown to include a wheel 920 having a tire 922 located about an outer rim 924. Outer rim 924 is fixedly attached to an inner rim 926 by radially extending spokes 928. Wheel 920 is shown to include an outboard portion 925 and an inboard portion 927. Arrangement 900 is shown to further include a hand rim 910 coupled to a planetary gear system 930. Hand rim 910 may be a traditional hand rim (e.g., hand rim 120) or an ergonomically designed hand rim (e.g., hand rim 820). Planetary gear system 930 is shown to include a sun gear 932, a ring gear 934, and one or more planetary gears 936.

In arrangement 900, ring gear 934 is fixedly attached to hand rim 910 and sun gear 932 is fixedly attached to wheel 920. Planetary gears 936 may be supported by a planet carrier 950. Planet carrier 950 may be the same or similar to planet carrier 750 described in reference to FIG. 7B. Planet carrier 950 may be releasably secured to a frame of the manually-operated mobility device via a locking axle assembly (e.g., quick-release axle assembly 700) or via a threadless quill stem. Ring gear 934 (fixed to hand rim 910) engages planetary gears 936, which in turn engage sun gear 923 (fixed to wheel 920).

In some embodiments, arrangement 900 further includes a bearing 940 and a coupling plate 960. Bearing 940 may be a large bore, small cross-section bearing (e.g. a thin section bearing) positioned between ring gear 934 and inner rim 926. Bearing 940 may facilitate rotation of ring gear 934 relative to wheel 920. Coupling plate 960 may attach to inboard portion 927 of wheel 920 for enclosing or protecting planetary gear system 930 and ensuring the proper alignment of sun gear 932 and ring gear 934 with planetary gears 936. Coupling plate 960 may be fixedly attached to both sun gear 932 and wheel 920, thereby rotatably coupling wheel 920 to sun gear 932.

Arrangement 900 may provide a lower gear ratio relative to arrangement 100 such that fewer revolutions of hand rim 910 are required to generate an increased number revolutions of wheel hub 920. The lower gear ratio is achieved by using ring gear 934 as the input gear and using sun gear 932 as the output gear. For example, ring gear 934 may have a number of teeth $N_r$ exceeding the number of teeth $N_s$ of sun gear 932. Therefore, the gear ratio between ring gear 934 and sun gear 932 may be expressed as $N_r:N_s$, where $N_r/N_s$ is greater than 1. Advantageously, a user's cadence (e.g., pace, velocity, speed, etc.) when traveling using arrangement 900 is multiplied by the gear ratio $N_r/N_s$.

Arrangement 900 may provide a "low gear" configuration for the manually-operated mobility device. For example, if the user chooses to pull hand rim 910 at the same angular velocity as in a standard 1:1 wheel configuration, then the rate at which the user accelerates will be greater than the standard by a factor of $N_r/N_s$. The low gear configuration provided by arrangement 900 may achieve a faster acceleration than both the "high gear" rowing/pulling propulsion mode in arrangement 100 and the traditional propulsion mode where hand rim 120 is directly connected to wheel 108.

Figure 10A:
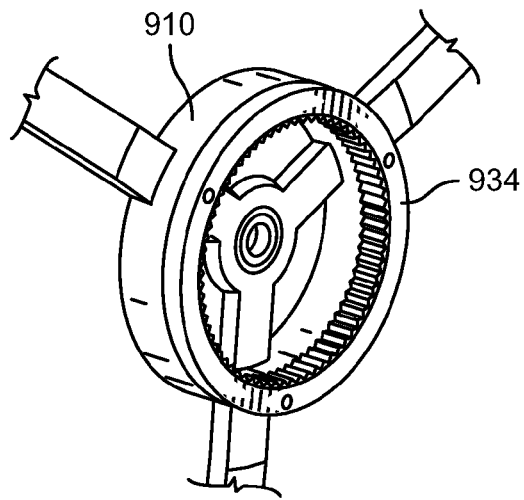
FIGS. 10A-10F are drawings illustrating a process of assembling the propulsion system of FIG. 9, according to an exemplary embodiment.
Figure 10B:
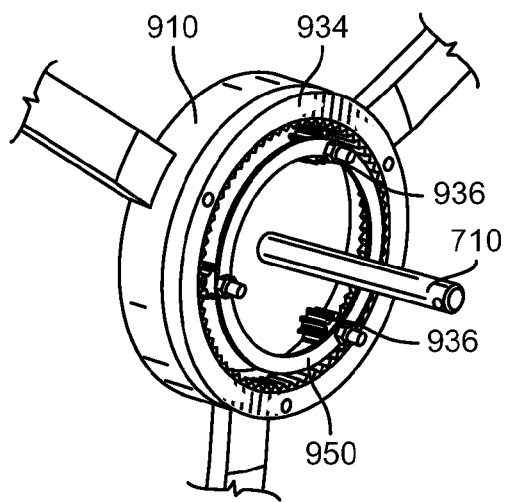

Referring now to FIGS. 10A-10F, a process for assembling the components of arrangement 900 is illustrated, according to an exemplary embodiment. As shown in FIG. 10A, ring gear 934 may be fixedly attached to an inner hub portion of hand rim 910 via mounting posts or bolts. As shown in FIG. 10B, planet carrier 950 may be attached to quick-release axle 710 and positioned inside ring gear 934 such that the teeth of planetary gears 936 engage the teeth of ring gear 934. A bearing may be positioned between quick-release axle 710 and hand rim 910 for allowing rotation of hand rim 910 relative to axle 710.

Figure 10C:
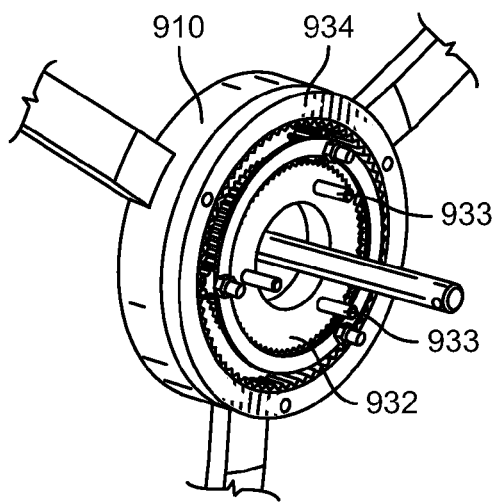
Figure 10D:
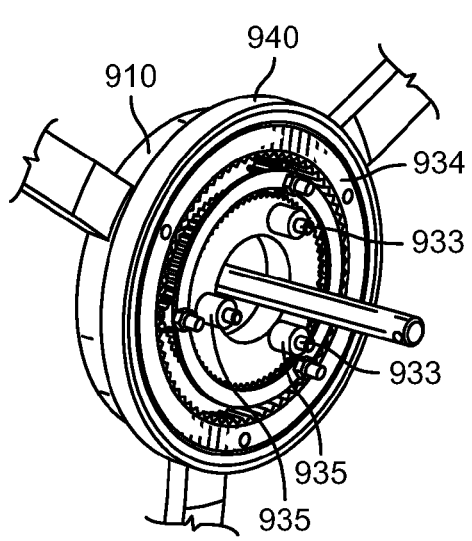

As shown in FIG. 10C, sun gear 932 may be inserted around quick-release axle 710 and positioned between planetary gears 936 such that the teeth of sun gear 932 engage the teeth of planetary gears 936. Sun gear 932 is shown to include a plurality of pegs 933 extending from an inboard-facing surface of sun gear 932. Pegs 933 may be fixedly attached to sun gear 932 and may be used for fixing sun gear 932 to wheel 920 (e.g., via coupling plate 960). As shown in FIG. 10D, bearing 940 may be positioned around sun gear 934 for allowing rotation of sun gear 934 (fixed to hand rim 910) relative to inner rim 926. In some embodiments, spacer elements 933 may be inserted into pegs 932 for ensuring a proper alignment of sun gear 932 with planetary gears 936.

Figure 10E:
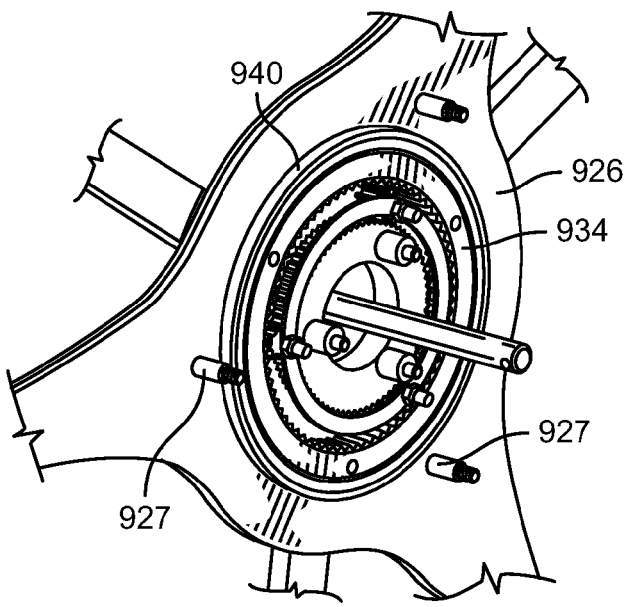
Figure 10F:
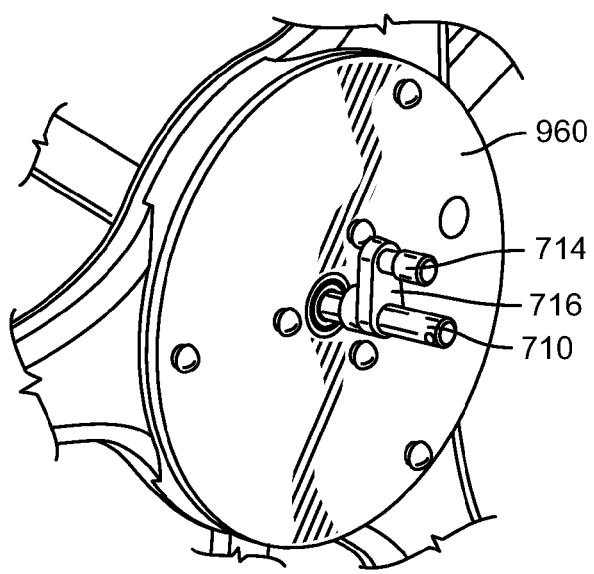

As shown in FIG. 10E, inner rim 926 of wheel 920 may be positioned along an outer circumferential face of bearing 940. Inner rim 926 is shown to include pegs 927 extending from an inboard-facing surface of inner rim 926. Pegs 927 may be fixed to inner rim 926 and may be used for fixing inner rim 926 to sun gear 932 (e.g., via coupling plate 960). As shown in FIG. 10F, coupling plate 960 may be fixedly attached to pegs 933 and pegs 927 extending from sun gear 932 and inner rim 926 respectively. A bearing may be provided between coupling plate 960 and quick-release axle 710 for facilitating rotation of coupling plate 960 (fixed to wheel 920) relative to quick-release axle 710. Once coupling plate 960 has been positioned, pin lock guide 716 and dowel pin 714 may be attached to quick-release axle 710.

Arrangement 900 may be mounted onto a frame of a manually operated mobility device by inserting the end stubs of axle 710 into corresponding apertures (e.g. sockets, bosses, collars, etc.) in the frame. Dowel pin 714 engages a slot or catch on the frame such that quick-release axle 710 and planet carrier 950 are fixed to the frame (e.g., planetary gears 936 may rotate about fixed axes). Sun gear 932 and the ring gear 934 rotate in opposite directions in the rowing/pulling propulsion mode.

A user may propel a manually-operated mobility device making use of arrangement 900 by pulling on hand rim 910 (e.g., using a rowing motion). Hand rim 910 is coupled to ring gear 934 and mounted on a bearing between hand rim 910 and axle 710. Ring gear 934 engages planetary gears 936 which rotate about stationary axes. Planetary gears 936 engage sun gear 932 which is fixed to wheel 920 via coupling plate 960. Wheel 920 rotates about bearing 940 positioned between wheel 920 and ring gear 934.

The input force for driving wheel 920 is directed from the user through the center of hand rim 910 into ring gear 934. Fixing planet carrier 950 to the wheelchair frame results in the opposing rotation between hand rim 910 (attached to ring gear 934) and wheel 920 (attached to sun gear 932). According to one embodiment, fixing planet carrier 950 relative to the wheelchair frame is accomplished by fixing planet carrier 950 to quick-release axle assembly 700 (e.g., by press fitting axle 710 into an undersized axle slot in planet carrier 950).

Figure 11:
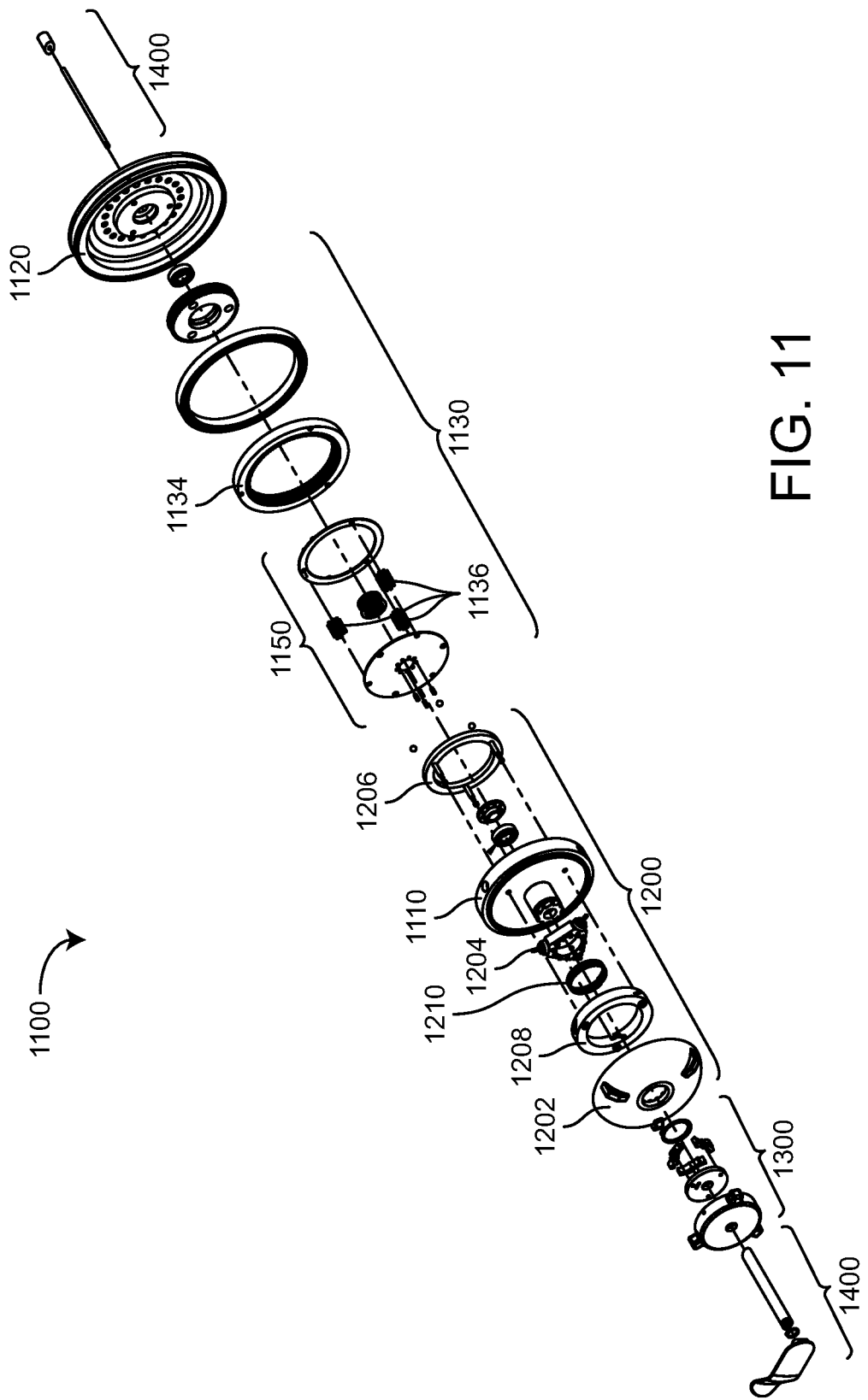
FIG. 11 is a drawing of a propulsion system for a manually-operated mobility device shown in another low gear arrangement and including several additional features including a turn shifter mechanism, an anti-rollback mechanism, and a threadless quill assembly, according to an exemplary embodiment.

Referring now to FIG. 11, another arrangement 1100 of a propulsion system for a manually-operated mobility device is shown, according to an exemplary embodiment. Arrangement 1100 is shown as a "low gear" arrangement, similar to arrangement 900. Arrangement 1100 is shown to include a hand rim hub 1100 coupled to planetary gear system 1130. Planetary gear system 1103 includes a ring gear 1134 fixed to hand rim hub 1110, sun gear 1132 fixed to a wheel hub 1120, and planetary gears 1134 held by a planet carrier 1150. Planet carrier 1150 may be fixed to a frame of the manually-operated mobility device by use of a threadless quill stem assembly 1400. Sun gear 1132 engages planetary gears 1136, which in turn engage ring gear 1134. According to one embodiment, the planetary gearing ratio is approximately 1:1.3, (e.g., rotating hand rim hub 1100 through one complete revolution causes wheel hub 1130 to perform 1.3 revolutions). In other embodiments, other gearing ratios may be used to suit the needs of a particular user or application (e.g. exercise, rehabilitation, athletic or recreational activities, etc.).

Arrangement 1100 is shown to further include a propulsion mode-shifting mechanism 1200 (e.g. in the manner of a manually rotatable dial or the like), an anti-rollback mechanism 1300, and a quill-stem assembly 1400. Mechanism 1200 may be used to shift the manually-operated mobility device between a rowing/pulling mode to a traditional pushing mode. Anti-rollback mechanism 1300 may be used to prevent a user from rolling backwards when rolling up an incline. Quill-stem assembly 1400 may be used for quickly and releasably securing a central axle of the propulsion system to a frame for the manually-operated mobility device.

Figure 12A:
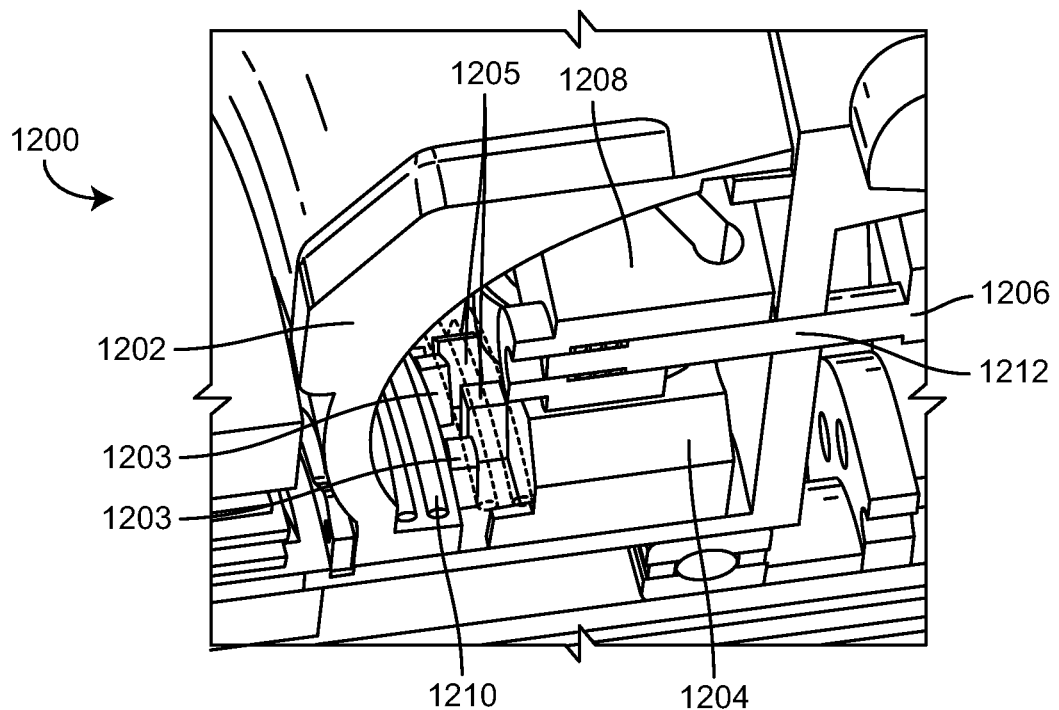
FIGS. 12A-12F are drawings illustrating in greater detail the turn shifter mechanism of FIG. 11, according to an exemplary embodiment.
Figure 12B:
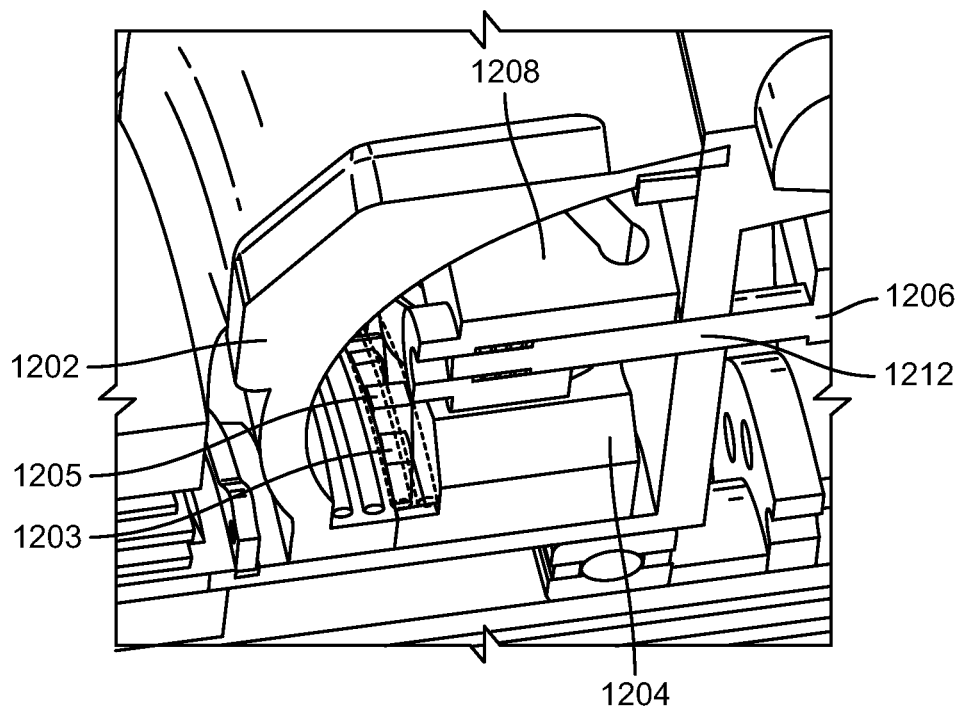

Referring now to FIGS. 12A-12, rotatable shifting mechanism 1200 is shown in greater detail, according to an exemplary embodiment. Mechanism 1200 is shown to include a turn shifter face 1202, a turn shifter 1204, a shift ring 1206, a cam follower ring 1208, and a turn shifter face spring 1210. Turn shifter face 1202 may be a dial, knob, or other rotatable component positioned outboard of hand rim hub 1110. As shown in FIG. 12A, turn shifter face 1202 includes teeth 1203 extending from an inboard-facing surface of turn shifter face 1202. Turn shifter 1204 is shown positioned inboard of turn shifter face 1202. Turn shifter 1204 includes teeth 1205 extending from an outboard-facing surface of turn shifter 1204. Spring 1210 may ordinarily bias turn shifter face 1202 away from turn shifter 1204, thereby keeping teeth 1203 disengaged from teeth 1205. When teeth 1203,1205 are disengaged, turn shifter face 1202 may rotate independently of turn shifter 1204. As shown in FIG. 12B, when teeth 1203, 1205 are meshed, turn shifter face 1202 and turn shifter 1204 rotate together.

Figure 12C:
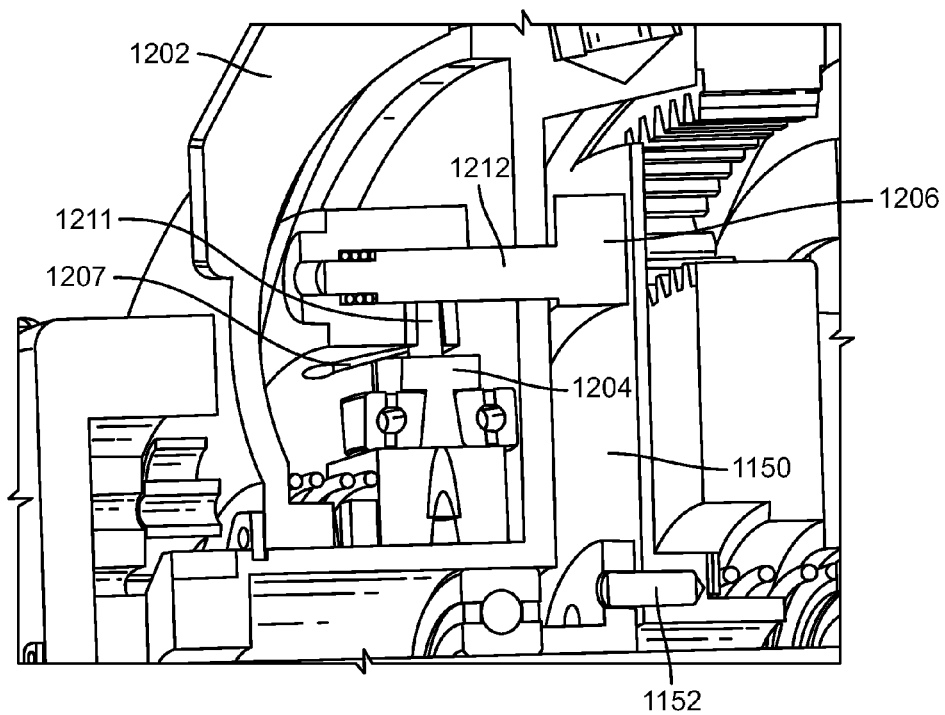
Figure 12D:
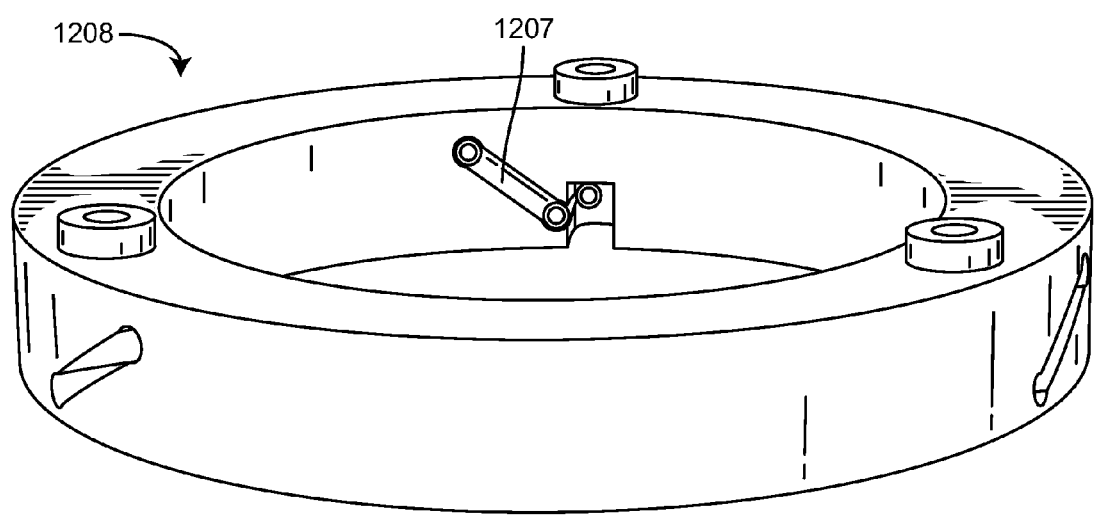

Referring specifically to FIG. 12C, turn shifter 1204 is shown to include one or more cams 1211 extending radially outward from an outer circumferential surface of turn shifter 1204. Cams 1211 may be positioned within cam slots 1207 positioned along an inner circumferential surface of cam follower ring 1208. Rotation of turn shifter 1204 relative to cam follower ring 1208 causes cams 1211 to slide within cam slots 1207. As shown in FIG. 12D, cam slots 1207 are obliquely disposed along the inner circumferential face of cam follower ring 1208. This oblique disposition causes cam follower ring 1208 to move in an inboard or outboard direction (e.g., left and right in FIG. 12C) in response to cams 1211 moving within cam slots 1207.

Figure 12E:
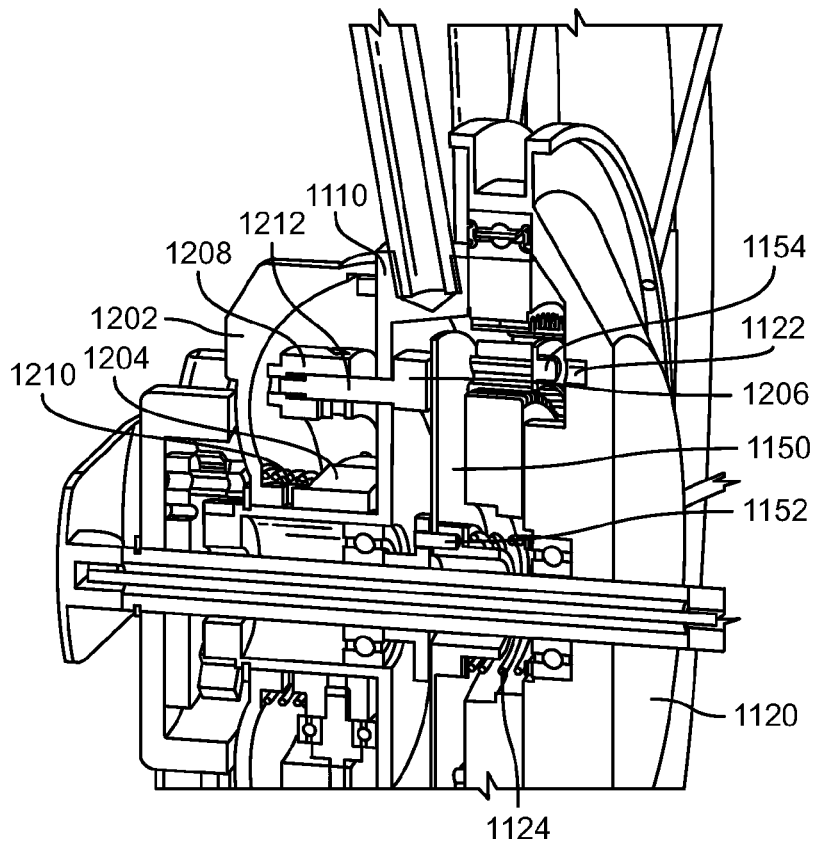

Referring specifically to FIG. 12E, cam follower ring 1208 may be fixed to shift ring 1206 via one or more pins 1212 extending in an outboard direction from an outboard-facing surface of shift ring 1206. Pins 1212 may be posts, mounts, bolts, or other linking elements connecting shift ring 1206 to cam follower ring 1208. In some embodiments, pins 1212 extend through holes in hand rim hub 1110. As cam follower ring 1208 moves in an inboard or outboard direction, pins 1212 may cause a corresponding movement of shift ring 1206. Advantageously, shift ring 1206 may be positioned directly outboard of planet carrier 1150 such that an inboard movement of shift ring 1206 pushes on planet carrier 1150, thereby causing planet carrier 1150 to move in an inboard direction. Such movement of planet carrier 1150 may be used to shift between the rowing propulsion mode and the traditional propulsion mode.

Figure 12F:
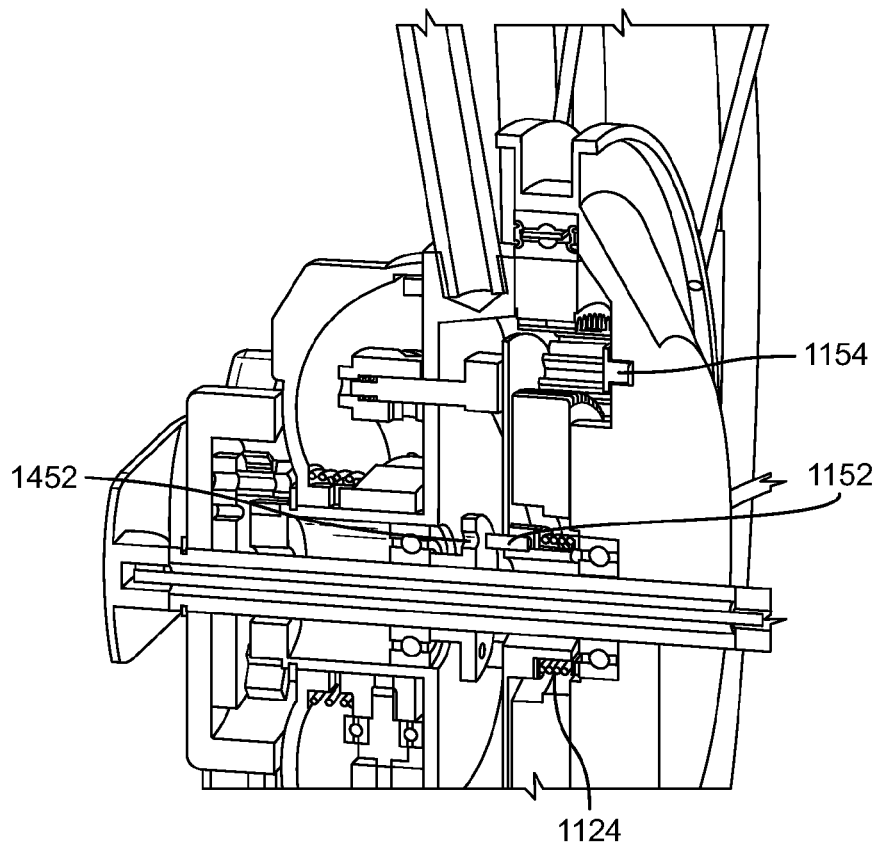

For example, as shown in FIGS. 12E-12F, planet carrier 1150 may include coupling pegs 1152 and 1154. Coupling peg 1152 is shown extending from an outboard plate of planet carrier 1150 and coupling peg 1154 is shown extending from an inboard plate of planet carrier 1150. Peg 1152 may be configured to engage an opening 1452 on an axle bushing fixed to quill-stem assembly 1400. When peg 1152 engages opening 1452, planet carrier 1150 is fixed relative to quill-stem assembly 1400, which may be fixed to a frame of the manually-operated mobility device. Peg 1154 may be configured to engage an opening 1122 on an outboard-facing surface of wheel hub 1120. When peg 1154 engages opening 1122, planet carrier 1150 is fixed relative to wheel hub 1120, thereby causing planet carrier 1150 to rotate along with wheel hub 1120.

As shown in FIG. 12E, in the rowing propulsion mode, turn shifter face 1202 is ordinarily biased away from turn shifter 1204 by turn shifter face spring 1210. To shift into standard or traditional pushing propulsion mode from the rowing mode, a user pushes turn shifter face 1202 in an inboard direction (e.g., toward wheel hub 1120) such that teeth 1203 engage corresponding teeth 1205. Once engaged, the user turns turn shifter face 1202 counter clockwise which causes cams 1211 extending from turn shifter 1204 to slide within cam slots 1207 on cam follower ring 1208. The movement of cams 1211 within cam slots 1207 forces cam follower ring 1208 to move away from turn shifter face 1202 and toward planet carrier 1250. Such movement of cam follower ring 1208 pushes shift ring 1206, which pushes planet carrier 1150 toward the wheel hub 1120 and compresses a spring 1124 mounted between planet carrier 1150 and wheel hub 1120. As planet carrier 1150 is pushed toward wheel hub 1120, coupling peg 1152 disengages from opening 1452 on an axle bushing fixed to stationary quill-stem assembly 1400. This movement of planet carrier 1150 also causes coupling peg 1154 to engage opening 1122 on an outboard-facing surface of wheel hub 1120. Planet carrier 1150 therefore disengages from quill stem assembly 1400 and engages wheel hub 1120. In this manner, the traditional propulsion mode is achieved because input motion by the user to hand rim 1110 will rotate ring gear 1134. The rotation of ring gear 1134 will rotate planet carrier 150 and sun gear 1132 (which are both fixed to wheel hub 1120), resulting in direct rotation of wheel hub 1120.

As shown in FIG. 12F, to shift back from traditional pushing mode to the rowing/pulling mode, the user again pushes turn shifter face 1202 toward wheel hub 1120 to engage turn shifter 1204. Once engaged, the user turns turn shifter face 1202 clockwise causing cam 1211 to travel back along cam slot 1207 in cam follower ring 1208. Such movement of cam 1211 within cam slot 1207 allows cam follower ring 1208 to move back toward turn shifter face 1208 and away from planet carrier 1150 as the compression in spring 1124 is released. Planet carrier 1150 is then able to move in an outboard direction (e.g., away from wheel hub 1120). This movement of planet carrier 1150 disengages coupling peg 1154 from opening 1122 and reengages opening 1452 with coupling peg 1152. In this manner, planet carrier 1150 is fixed to stationary quill stem assembly 1400 and to the frame of the mobility device. Ring gear 1134 and sun gear 1132 rotate in opposite directions, thereby achieving the rowing propulsion mode.

Figure 13A:
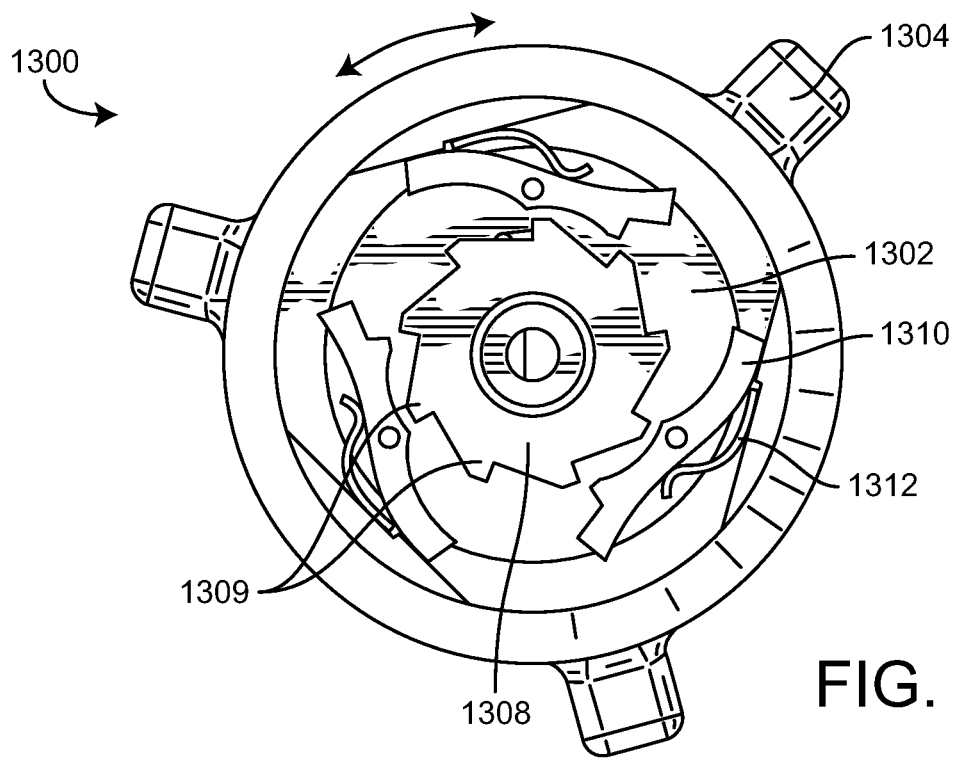
FIGS. 13A-13E are drawings illustrating in greater detail the anti-rollback mechanism of FIG. 11, according to an exemplary embodiment.
Figure 13B:
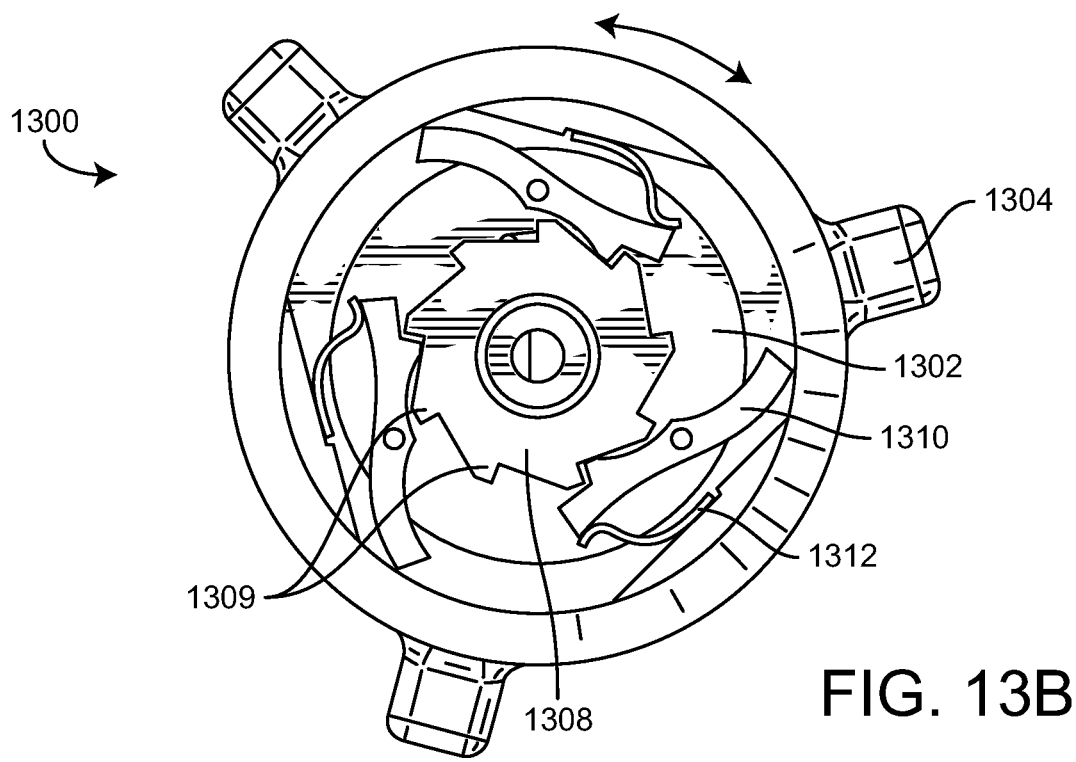

Referring now to FIGS. 13A-13B, anti-rollback mechanism 1300 is shown in greater detail, according to an exemplary embodiment. Mechanism 1300 is shown as a ratchet mechanism which may be engaged when the manually operated mobility device is traveling up an incline. Mechanism 1300 may function to prevent the mobility device from rolling backwards down the incline when the user releases the hand rim to initiate a new stroke. Anti-rollback mechanism 1300 may allow a user to rest or take a break from traveling up an incline without requiring the user to maintain a grip on the hand rim.

Anti-rollback mechanism 1300 is shown to include an anti-rollback flange 1302, an anti-rollback lever 1304, a ratcheted hub 1308, and several pawls 1310 and leaf springs 1312. Anti-rollback flange 1302 may be fixed to quill stem assembly 1400 (e.g. with a press fit, etc.). Pawls 1310 may be rotatably coupled to anti-rollback flange 1302 (e.g., using pins, bolts, or other fastener allowing rotation of pawls 1310 relative to flange 1302). Leaf springs 1312 may be fixed at one end to anti-rollback lever 1304. Anti-rollback lever 1304 may be mounted on an axle of the manually-operated mobility device outboard from anti-rollback flange 1302. Anti-rollback lever 1304 may rotate about the axle by an amount dictated by the movement of a pin (not shown) extending from an inboard-facing surface of lever 1304 within a slotted arc (not shown) in an outboard-facing surface of anti-rollback flange 1302.

To engage anti-rollback mechanism 1300, a user rotates anti-rollback lever 1304 from the position shown in FIG. 13A to the position shown in FIG. 13B. As anti-rollback lever 1304 rotates, leaf springs 1312 engage pawls 1310, causing pawls 1310 to rotate. Such rotation causes pawls 1310 to engage teeth 1309 on ratcheted hub 1308. Advantageously, pawls 1310 rotate about stationary axes extending from flange 1302. As a user travels up incline with anti-rollback mechanism 1300 engaged, pawls 1310 prevent backward rotation direction of ratcheted hub 1308. Leaf springs 1312 may be sufficiently compliant to allow pawls 1310 to rotate as the user continues to travel up the incline.

Figure 13C:
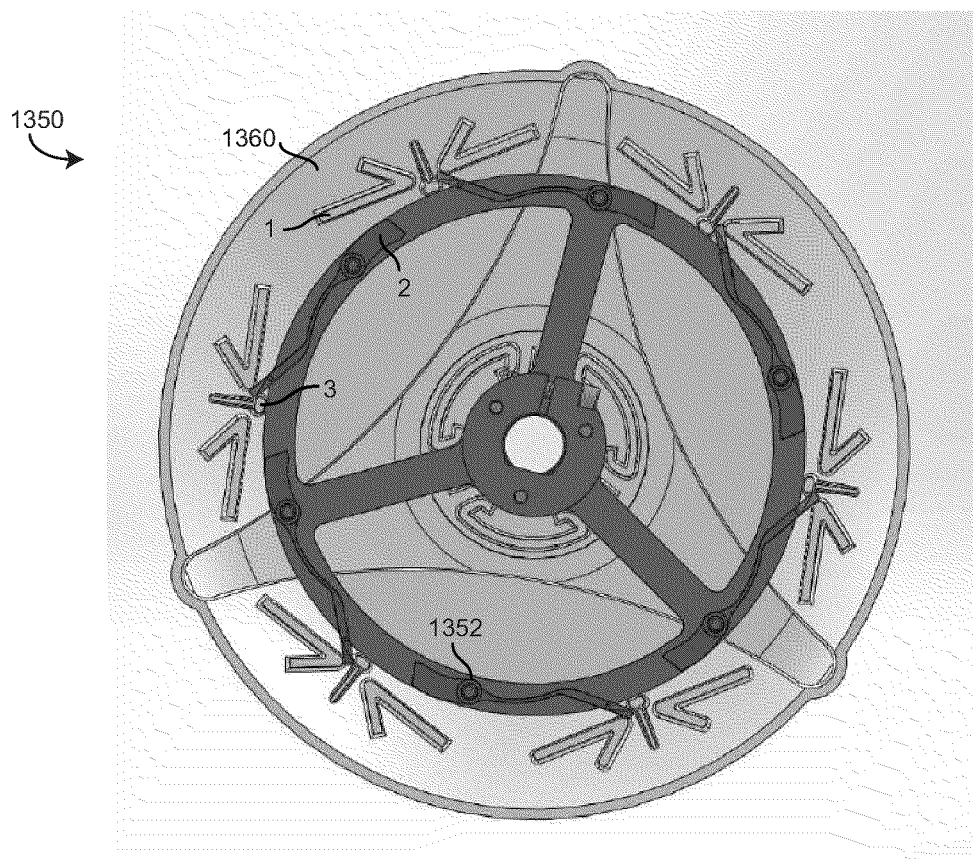
Figure 13D:
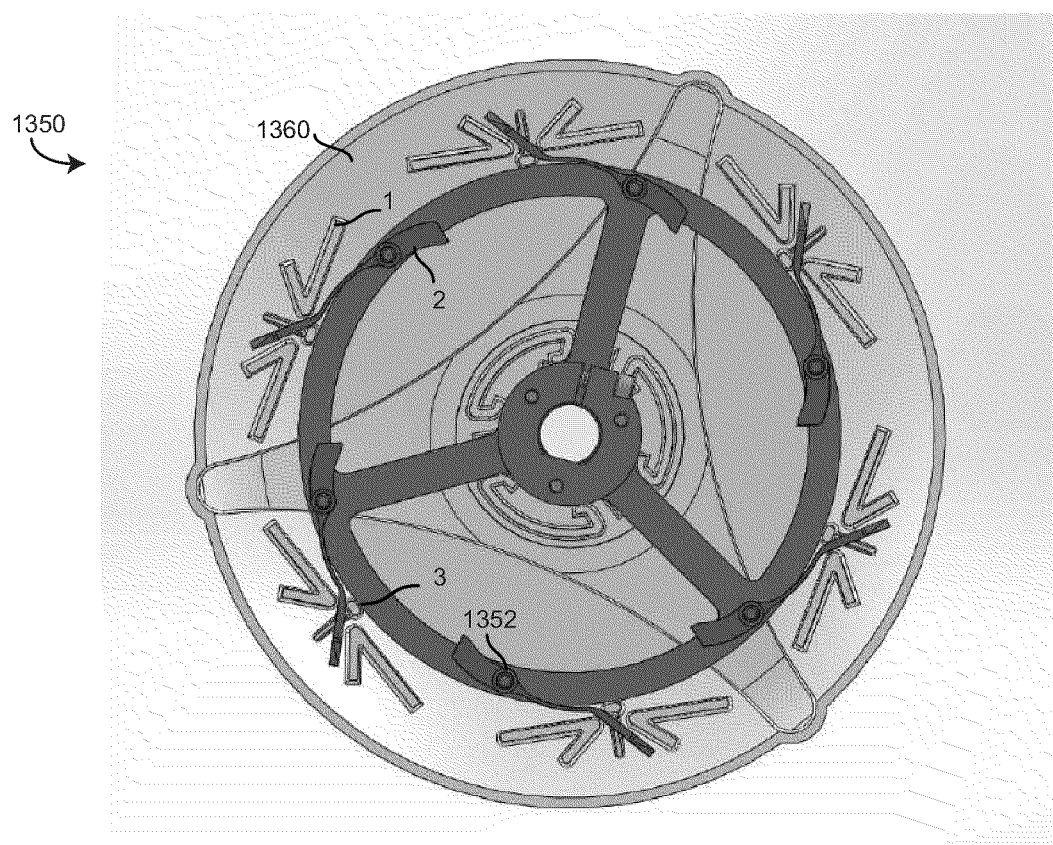
Figure 13E:
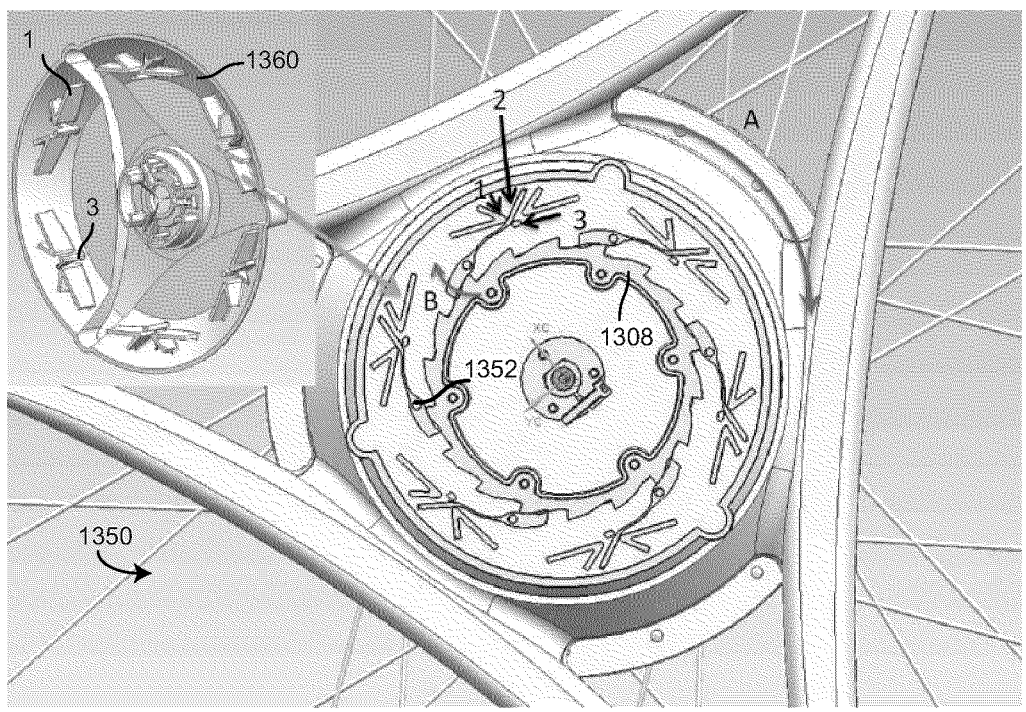

Referring now to FIGS. 13C-13E, an alternate embodiment 1350 of an anti-rollback mechanism is shown, according to an exemplary embodiment. In embodiment 1350, pawls 1310 have been replaced with pawls 2 and leaf springs 1312 have been replaced with wedges 1 and peg 3. Wedges 1 and peg 3 are part of anti-rollback cap 1360. Pawls 2 are rotatable about stationary axes 1352. Cap 1360 may be rotated relative to stationary axes 1352. As cap 1360 is rotated, wedges 1 and peg 3 cause pawls 2 to rotate about stationary axes 1352 between a disengaged position (shown in FIG. 13C) and an engaged position (shown in FIG. 13D). As shown in FIG. 13E, a user may cause pawls 2 to engage or disengage ratcheted hub 1308 by controlling the rotational position of pawls 2.

Figure 14A:
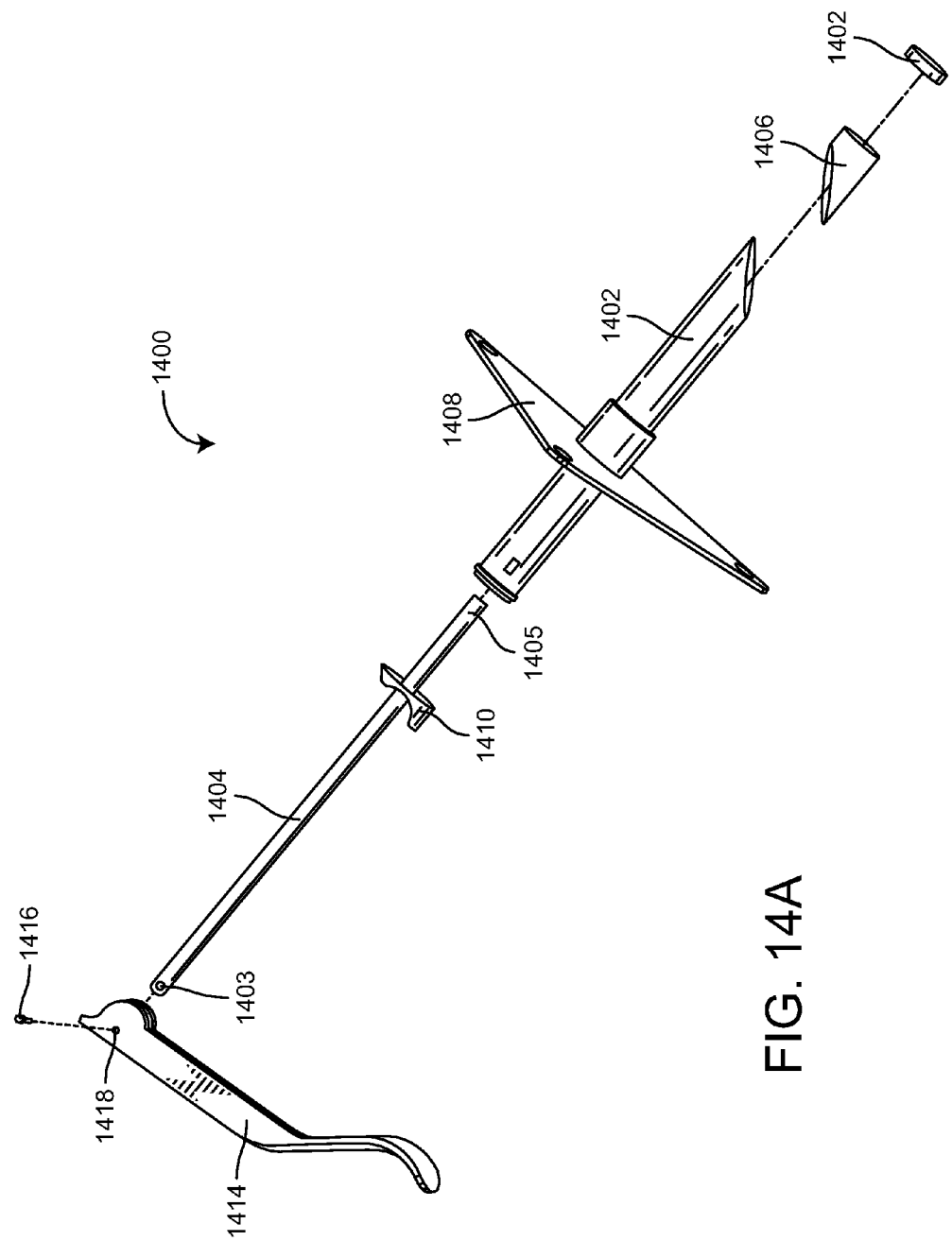
FIGS. 14A-14C are drawings illustrating in greater detail the threadless quill assembly of FIG. 11, according to an exemplary embodiment.
Figure 14B:
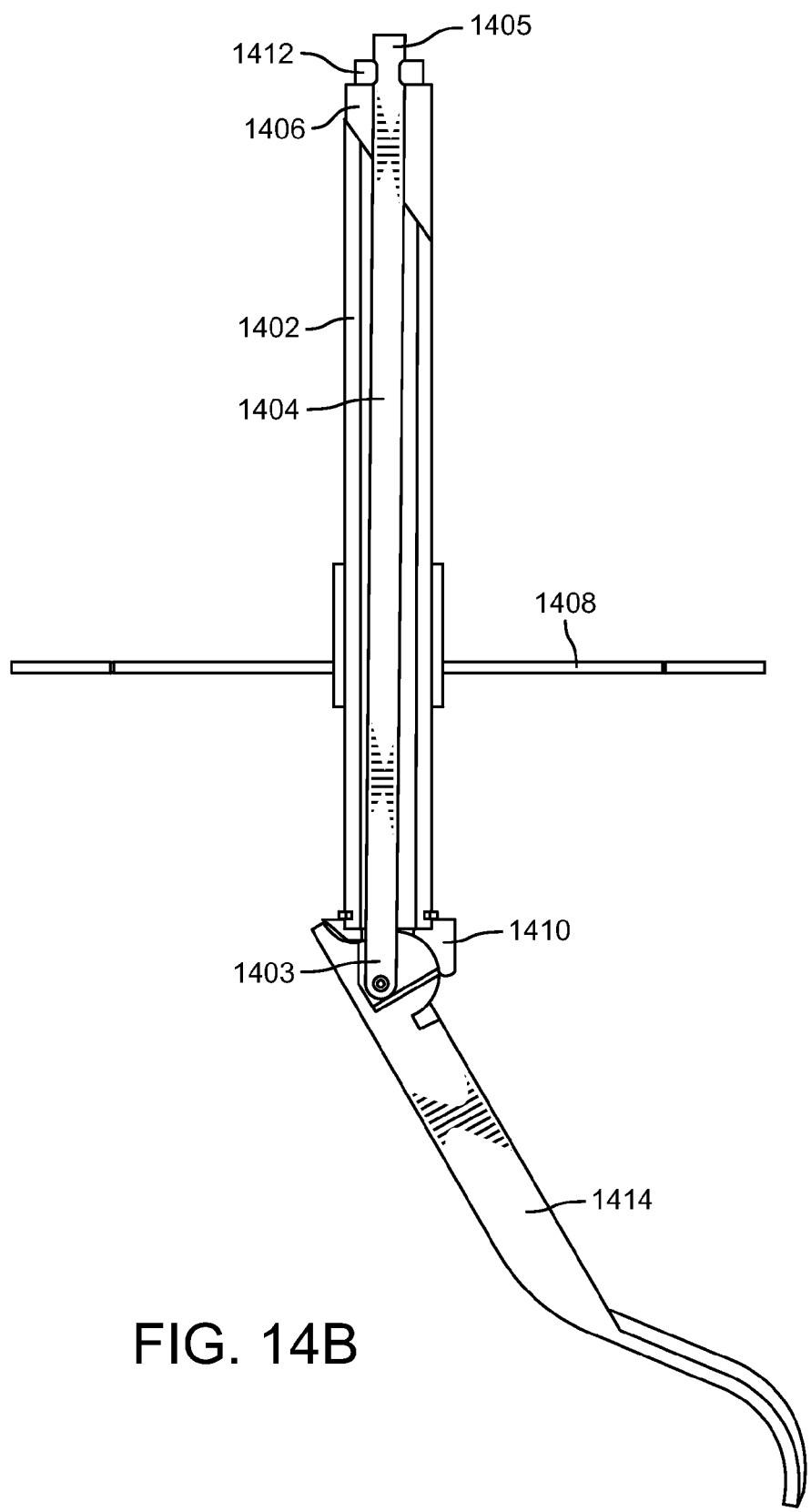
Figure 14C:
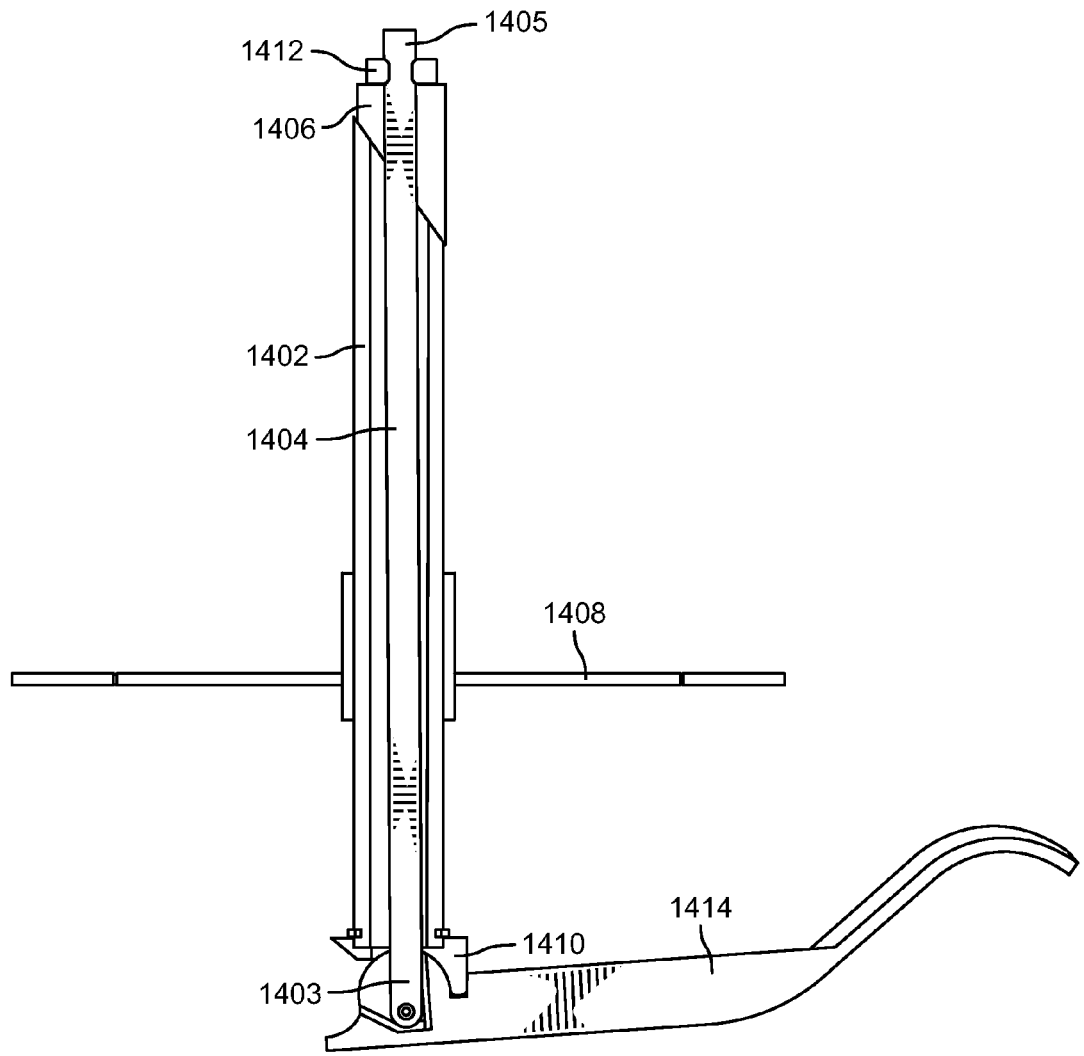

Referring now to FIGS. 14A-14C, threadless quill stem assembly 1400 is shown, according to an exemplary embodiment. Assembly 1400 is shown to include a main axle 1402, a quill stem 1404, an axle end segment 1406, an inner planet carrier plate 1408, a lever bearing shoulder 1410, a quill nut 1412, and a quill stem lever 1414. In some embodiments, axle 1402 and axle end segment 1406 may be made of steel and/or aluminum. A first end 1403 of lever 1414 may be coupled to quill stem 1404 through a connection pin 1416. A second end 1405 of lever 1414 may be coupled to quill nut 1412. A pin hole 1418 on quill stem lever 1414 is offset in such a way that when lever 1414 rotated toward carrier plate 1408 (e.g., from the position shown in FIG. 14B toward the position shown in FIG. 14C), end 1403 is pulled away from carrier plate 1408. Such motion of quill stem 1404 causes end 1405 and quill nut 1412 to move toward carrier plate 1408. This movement of quill nut 1412 causes axle end segment 1406 to move toward carrier plate 1408.

Advantageously, the tapered edge of axle end segment 1406 causes axle end segment 1406 to become offset from main axle 1402 as axle end segment moves toward carrier plate 1408. This offset causes quill stem assembly 1400 to become "jammed" thereby preventing rotation of axle 1402 relative to a frame of the manually-operated mobility device. When lever 1414 is pulled back and away from the wheel (e.g., from the position shown in FIG. 14C to the position shown in FIG. 14B), quill stem end 1403 is pushed back toward axle 1402. This movement of quill stem 1404 causes axle end segment 1406 to move away from carrier plate 1408, thereby allowing axle end segment 1406 to realign with axle 1402. Once realigned, assembly 1400 becomes un-jammed and can be easily removed or mounted to the frame.

Figure 15A:
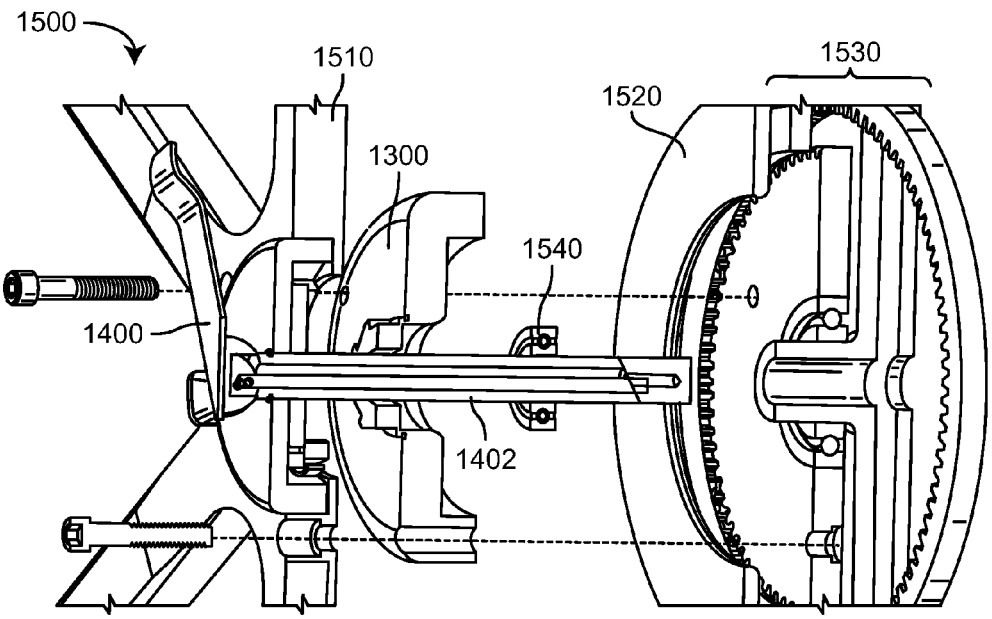
FIGS. 15A-15B are drawings of a propulsion system for a manually-operated mobility device shown in another high gear arrangement and including an anti-rollback mechanism, a quill stem assembly, and a turn shifter mechanism, according to an exemplary embodiment.
Figure 15B:
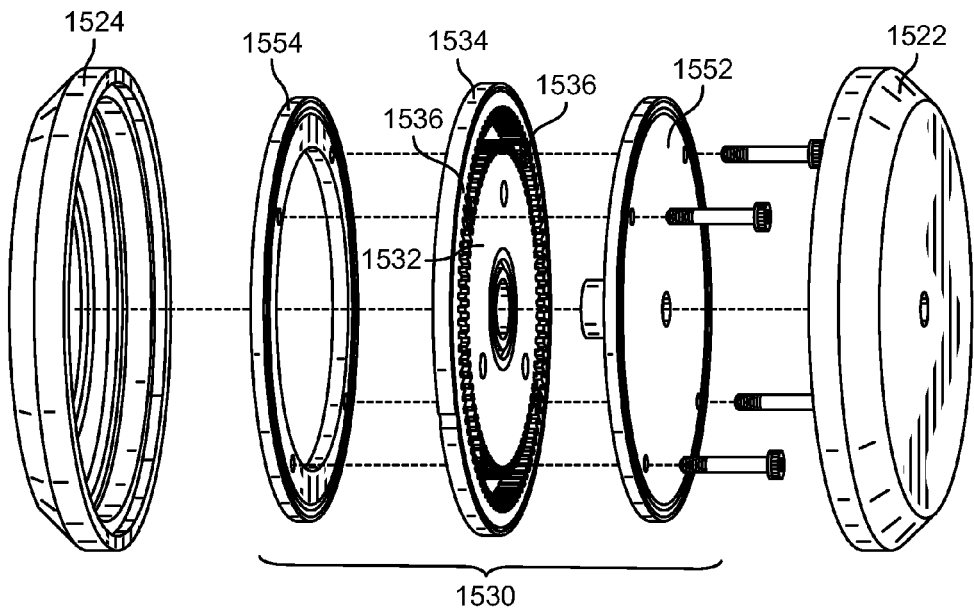

Referring now to FIGS. 15A-15B, another arrangement 1500 for a manually-operable mobility device is shown according to an exemplary embodiment. Arrangement 1500 may be a "high gear" arrangement (e.g., similar to arrangement 100). Arrangement 1500 is shown to include a hand rim 1510, a wheel hub 1520, and a planetary gear system 1530.

As shown in FIG. 15B, wheel hub 1520 may include an inboard casing 1522 and an outboard casing 1524 enclosing planetary gear system 1530. Planetary gear system 1530 includes a sun gear 1532, a ring gear 1534, and planetary gears 1536. Sun gear 1532 may be fixed to hand rim 1510 (e.g. in the manner of a "high gear" arrangement). Ring gear 1534 may be fixed to wheel hub 1520, which is fixed to an outer wheel rim (e.g., via spokes). Planetary gears 1536 may be supported by a planet carrier 1550 having an inboard planet carrier plate 1552 and an outboard planet carrier plate 1554. Planet carrier 1550 may be fixed to a stationary axle (e.g., axle 1402) of threadless quill stem assembly 1400. Sun gear 1532 engages planetary gears 1536, which in turn engage ring gear 1534. As shown in FIG. 15A, sun gear 1532 may be mounted to quill stem shaft 1402 through a bearing 1540 that allows sun gear 1532 to rotate freely relative to shaft 1402.

In some embodiments, arrangement 1500 may further include turn-shifting mechanism 1200 as previously described in reference to FIGS. 12A-12F. In some embodiments, arrangement 1500 further includes an anti-rollback mechanism similar to anti-rollback mechanism 1300 previously shown and described in reference to FIGS. 13A-13B. The pawls of the anti-rollback mechanism used in arrangement 1500 may engage a ratcheted hub coupled to a hub of hand rim 1510. One or more bolts may fixedly attach hand rim 1510 to sun gear 1532. Arrangement 1500 may further include a threadless quill stem assembly 1400 as previously shown and described in reference to FIGS. 14A-14C.

Referring now to FIGS. 16A-16D, a torque arm assembly 1600 is shown, according to an exemplary embodiment. Torque arm assembly 1600 may supplement or replace quill stem assembly 1400 for fixing a planet carrier (e.g., planet carrier 150, planet carrier 950, planet carrier 1550, etc.) to a frame 1620 of the manually-operated mobility device. Torque arm assembly 1600 is shown to include a torque arm 1602, a latch mechanism 1610, and a frame mount 1615.

Figure 16A:
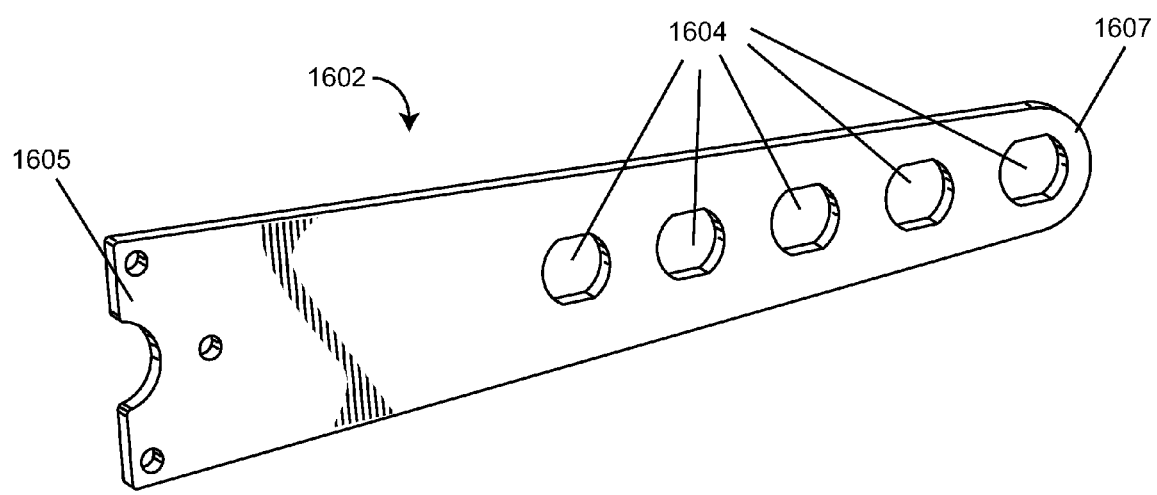
FIG. 16A-D are drawings of a torque arm for rotatably fixing the planet carrier to a frame of the manually-operated mobility device, according to an exemplary embodiment.
Figure 16B:
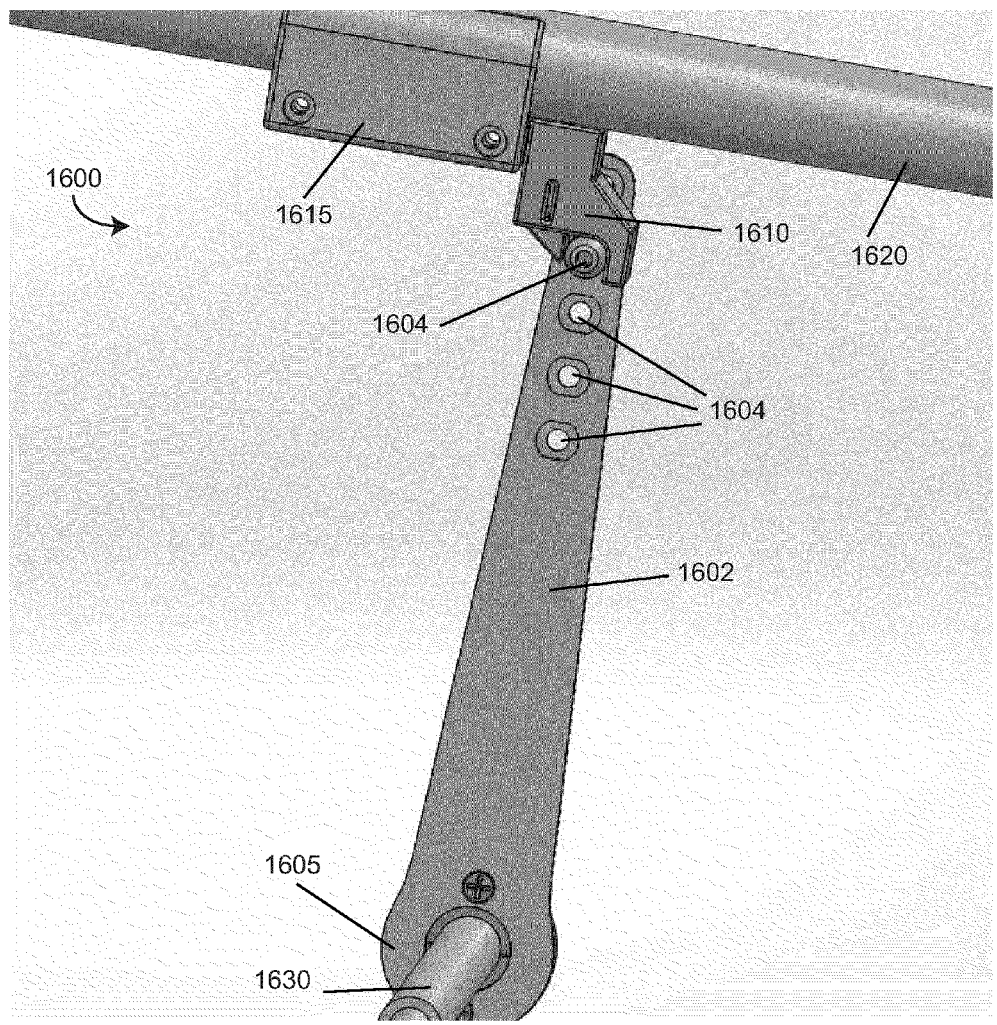

Referring specifically to FIG. 16A, torque arm 1602 is shown to include a first end 1605, a second end 1607, and a plurality of holes 1604 spaced incrementally between ends 1605 and 1607. As shown in FIG. 16B, end 1605 may attach to an axle 1630 of the manually-operated mobility device. In some embodiments, end 1605 may be fixedly attached to axle 1630. Axle 1630 may also fixedly attach to a planet carrier for fixing the planet carrier relative to torque arm 1602. Torque arm 1602 may extend from axle 1630 to an attachment point on frame 1620, thereby preventing axle 1630 from rotating relative to frame 1620.

Figure 16C:
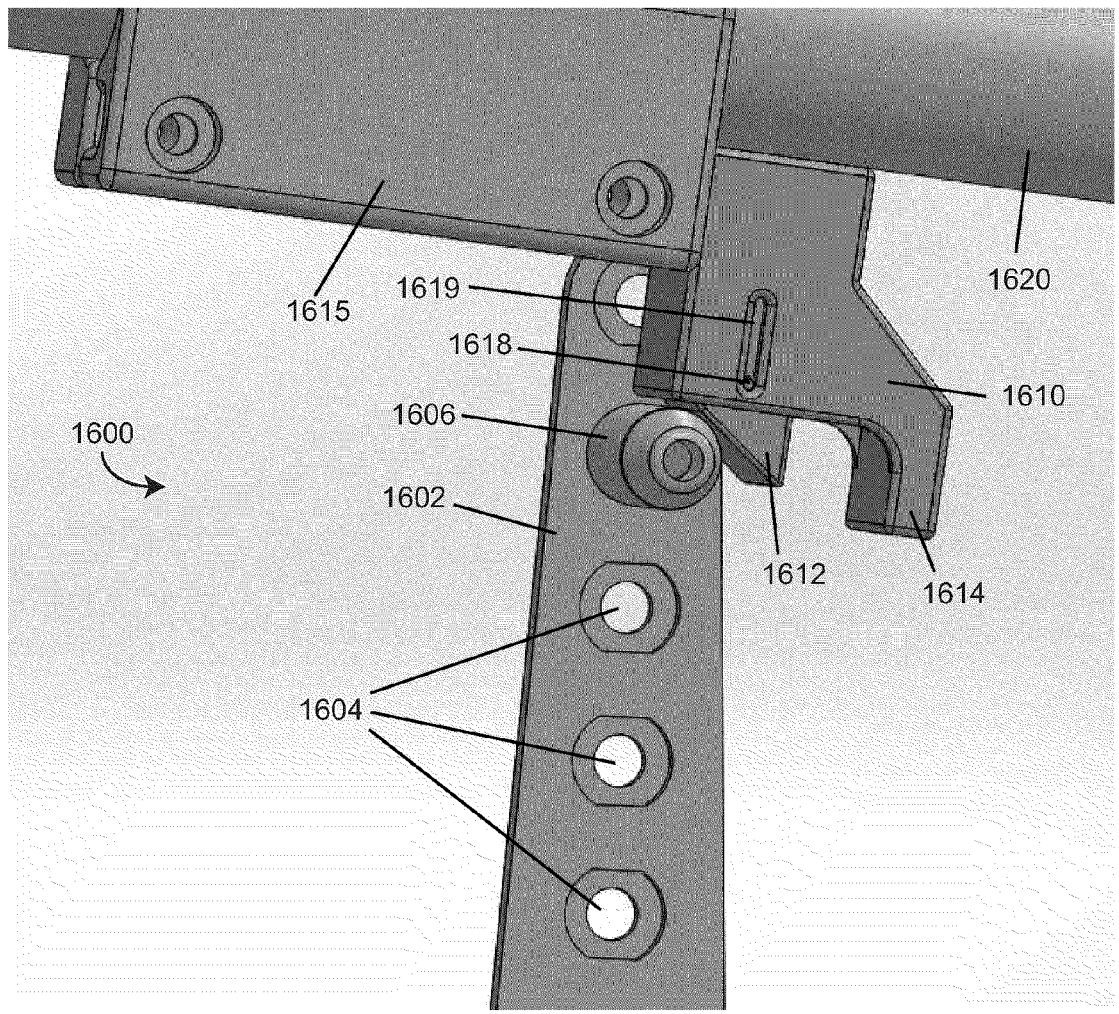
Figure 16D:
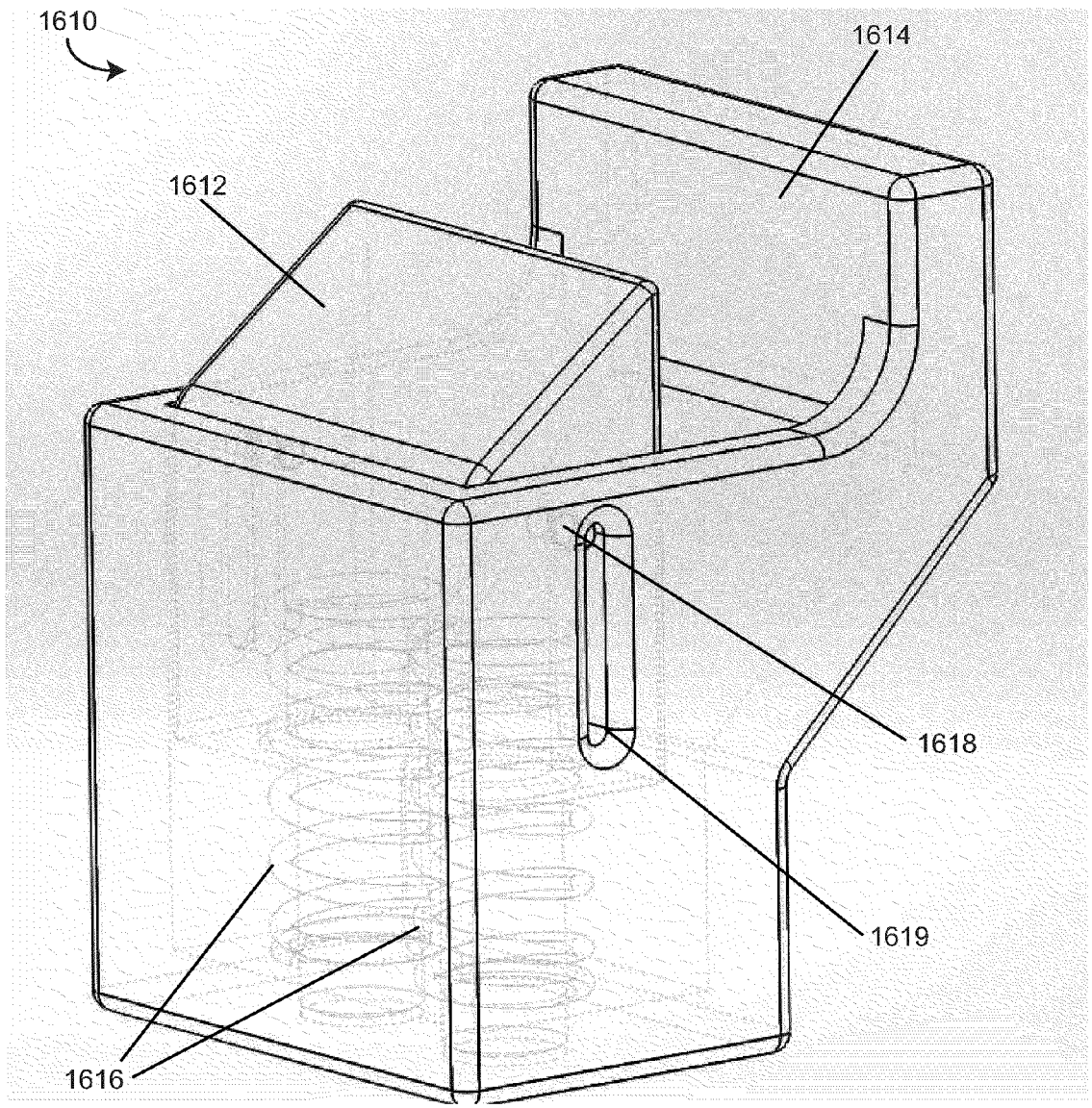

Referring specifically to FIG. 16D, latch mechanism 1610 is shown to include a fixed portion 1614 and a latch 1612. In some embodiments, latch 1612 may be pivotally connected with fixed portion 1614. In other embodiments, latch 1612 may move in translation (e.g., up, down, inward, outward, etc.) relative to fixed portion 1614. Latch mechanism 1610 is shown to further include springs 1616. Springs 1616 may hold latch 1612 in an outward position (as shown in FIG. 16D) unless an inward force is applied to latch 1612.

In some embodiments, latch mechanism 1610 may further include dowel pins 1618. Dowel pins 1618 may be fixedly attached to latch 1612 and may slide within slots 1619. Latch 1612 may include a pair of dowel pins 1618 and a pair of slots 1619 on opposing sides of latch mechanism 1610. Dowel pins 1618 may prevent springs 1616 from pushing latch 1612 completely out of latch mechanism 1610. In other embodiments, dowel pins 1618 may be supplemented or replaced by adding a shoulder or flange to latch 1612. The shoulder or flange may engage a fixed rim of latch mechanism 1610 (e.g., protruding inwardly from a perimeter around an opening within which latch 1612 moves) to prevent latch 1612 from being ejected from latch mechanism 1610.

As shown in FIG. 16B, latch mechanism 1610 may be attached to frame 1620. Latch mechanism 1610 may attach to frame 1620 directly (e.g., without any intermediate components) or indirectly (e.g., via frame mount 1615). Latch mechanism 1610 may be fixedly secured to frame 1620 for holding latch mechanism 1610 in a stable position.

Torque arm 1602 may engage latch mechanism 1610 via a pin 1606. As shown in FIG. 16C, pin 1606 may be inserted into one of holes 1604 and releasable secured to torque arm 1602 (e.g., via a bolt, nut, etc.). Advantageously, pin 1606 may be inserted into any of holes 1604, thereby allowing assembly 1600 to adapt to a variety of differently sized and/or configured mobility devices. As torque arm 1602 is rotated, pin 1606 may engage latch 1612, thereby compressing springs 1616 and allowing pin 1606 to move between latch 1612 and fixed portion 1614 (e.g., shown in FIG. 16B). Springs 1616 may then cause latch 1612 to move outward, thereby securing pin 1606 and holding torque arm 1602 in a fixed position. Advantageously, a user may rotate torque arm 1602 into engagement with larch mechanism 1610 by rotating a hand rim of the manually-operated mobility device.

The construction and arrangement of the elements of the propulsion systems for manually-operated mobility devices as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A propulsion system for a manually-operated mobility device, the propulsion system comprising:
   a hand rim configured to receive a propulsion force from a user of the manually-operated mobility device;
   a wheel hub fixedly attached to a wheel for the manually-operated mobility device; and
   a planetary gear system including a sun gear, a ring gear, and one or more planetary gears disposed between the sun gear and the ring gear, wherein the one or more planetary gears are supported by a planet carrier releasably attached to a frame of the manually-operated mobility device to transition the manually-operated mobility device between:
   a pushing propulsion mode in which the hand rim and the wheel hub rotate in a same rotational direction and the planet carrier rotates relative to the frame, and
   a rowing propulsion mode in which the hand rim and the wheel hub rotate in opposite rotational directions and the planet carrier is rotatable fixed relative to the frame;
   wherein one of the sun gear and the ring gear is fixedly coupled to the hand rim and the other of the sun gear and the ring gear is fixedly coupled to the wheel hub.

2. The propulsion system of claim 1, wherein the manually-operated mobility device is shiftable between the rowing propulsion mode in which the sun gear and the ring gear rotate in opposite directions and the pushing propulsion mode in which the sun gear and the ring gear rotate in unison.

3. The propulsion system of claim 2, further comprising:
   a shift collar fixedly coupled to the hand rim, wherein the shift collar includes one or more radially extending dowel pins,
   wherein the shift collar is movable between a first position in which the dowel pins engage one or more radially extending grooves in the sun gear for rotatably fixing the shift collar to the sun gear and a second position in which the dowel pins engage radially one or more extending grooves in the wheel hub for rotatably fixing the shift collar to the wheel hub,
   wherein shifting between the rowing propulsion mode and the pushing propulsion mode is accomplished by moving the shift collar between the first position and the second position.

4. The propulsion system of claim 3, wherein at least one of the shift collar, the sun gear, and the wheel hub include a magnetic element for securing the shift collar in the first position or the second position.

5. The propulsion system of claim 4, wherein the shift collar includes one or more magnets configured to engage a metallic portion of the sun gear when the shift collar is in the first position and wherein the wheel hub includes one or more magnets configured to engage a metallic portion of the shift collar when the shift collar is in the second position.

6. The propulsion system of claim 5, wherein the magnets of the shift collar are disposed along an inboard-facing surface of the shift collar and the metallic portion of the sun gear is disposed along an outboard-facing surface of the sun gear,
   wherein the magnets of the wheel hub are disposed along an inner radial face of the wheel hub and the metallic portion of the shift collar is disposed along an outer radial face of the shift collar.

7. The propulsion system of claim 2, further comprising:
a coaxial shifter fixedly coupled to the hand rim, wherein the coaxial shifter includes a first engagement pin extending from a first side of the coaxial shifter and a second engagement pin extending from a second side of the coaxial shifter;
wherein the coaxial shifter is movable between a first position in which the first engagement pin rotatably fixes the coaxial shifter to the sun gear and a second position in which the second engagement pin rotatably fixes the coaxial shifter to the wheel hub,
wherein shifting between the rowing propulsion mode and the pushing propulsion mode is accomplished by moving the coaxial shifter between the first position and the second position.

8. The propulsion system of claim 7, further comprising:
a locking mechanism for securing the coaxial shifter in the first position or the second position, wherein the locking mechanism includes:
a trigger handle attached to the coaxial shifter via one or more spring-loaded pins, wherein squeezing the trigger handle unlocks the locking mechanism and permits movement of the coaxial shifter between the first position and the second position.

9. The propulsion system of claim 2, further comprising:
a cam lever mechanism movable between an engaged position in which the cam lever mechanism rotatably fixes the planet carrier to the frame of the manually-operated mobility device and a disengaged position in which the cam lever mechanism permits rotation of the planet carrier relative to the frame; and
a quick-release pin movable between an engaged position in which the quick-release pin rotatably fixes the hand rim to the wheel hub and a disengaged position in which the quick-release pin permits rotation of the hand rim relative to the wheel hub,
wherein shifting between the rowing propulsion mode and the pushing propulsion mode is accomplished by disengaging one of the cam lever mechanism and the quick-release pin and engaging the other of the cam lever mechanism and the quick-release pin.

10. The propulsion system of claim 2, further comprising:
a rotatable shifting mechanism configured to shift the planet carrier between a first position in which the planet carrier is rotatably fixed to a stationary axle of the manually-operated mobility device and a second position in which the planet carrier is rotatably fixed to the wheel hub,
wherein shifting between the rowing propulsion mode and the pushing propulsion mode is accomplished by shifting the planet carrier between the first position and the second position.

11. The propulsion system of claim 1, wherein the hand rim is fixedly coupled to the sun gear and the wheel hub is fixedly coupled to the ring gear,
wherein coupling the hand rim and the sun gear and coupling the wheel hub and the ring gear results in a high-gear arrangement in which a mechanical advantage is provided to the user of the manually-operated mobility device such that a complete revolution of the hand rim results in a rotation of less than a complete revolution of the wheel hub.

12. The propulsion system of claim 1, wherein the hand rim is fixedly coupled to the ring gear and the wheel hub is fixedly coupled to the sun gear,
wherein coupling the hand rim and the ring gear and coupling the wheel hub and the sun gear results in a low-gear arrangement in which a complete revolution of the hand rim results in a rotation of more than a complete revolution of the wheel hub.

* * * * *